United States Patent
Ito et al.

(10) Patent No.: US 10,126,478 B2
(45) Date of Patent: Nov. 13, 2018

(54) RESIN COMPOSITION AND OPTICAL COMPENSATION FILM USING SAME

(71) Applicant: TOSOH CORPORATION, Shunan-shi (JP)

(72) Inventors: Masayasu Ito, Mie (JP); Takahiro Kitagawa, Mie (JP); Takuya Komine, Mie (JP); Kaori Suyama, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 14 days.

(21) Appl. No.: 15/519,403

(22) PCT Filed: Oct. 13, 2015

(86) PCT No.: PCT/JP2015/078929
§ 371 (c)(1),
(2) Date: Apr. 14, 2017

(87) PCT Pub. No.: WO2016/060115
PCT Pub. Date: Apr. 21, 2016

(65) Prior Publication Data
US 2017/0242174 A1 Aug. 24, 2017

(30) Foreign Application Priority Data

| Oct. 15, 2014 | (JP) | 2014-210357 |
| Oct. 15, 2014 | (JP) | 2014-210358 |
| Nov. 25, 2014 | (JP) | 2014-238140 |
| Nov. 26, 2014 | (JP) | 2014-239366 |
| Nov. 26, 2014 | (JP) | 2014-239367 |
| Sep. 18, 2015 | (JP) | 2015-185764 |

(51) Int. Cl.
| G02B 5/30 | (2006.01) |
| G02F 1/13363 | (2006.01) |
| C08L 33/02 | (2006.01) |
| C08L 35/00 | (2006.01) |
| C08L 1/28 | (2006.01) |
| C08J 5/18 | (2006.01) |

(52) U.S. Cl.
CPC .............. *G02B 5/3083* (2013.01); *C08J 5/18* (2013.01); *C08L 1/28* (2013.01); *C08L 33/02* (2013.01); *C08L 35/00* (2013.01); *G02F 1/13363* (2013.01); *C08J 2301/28* (2013.01); *C08J 2333/02* (2013.01); *C08J 2335/00* (2013.01); *C08J 2433/02* (2013.01); *C08J 2435/00* (2013.01); *C08L 2201/10* (2013.01); *C08L 2203/16* (2013.01)

(58) Field of Classification Search
None
See application file for complete search history.

(56) References Cited

U.S. PATENT DOCUMENTS

| 2002/0128341 A1* | 9/2002 | Sakai ................. C08G 61/02 522/1 |
| 2014/0153096 A1 | 6/2014 | Doi et al. |
| 2015/0232599 A1 | 8/2015 | Kitagawa et al. |
| 2016/0115333 A1 | 4/2016 | Ito et al. |

FOREIGN PATENT DOCUMENTS

| EP | 3 006 494 A1 | 4/2016 |
| JP | 5-297223 A | 11/1993 |
| JP | 5-323120 A | 12/1993 |
| JP | 2818983 B2 | 10/1998 |
| JP | 2001-337222 A | 12/2001 |
| JP | 2002-131534 A | 5/2002 |
| JP | 2008-64817 A | 3/2008 |
| JP | 2013-28741 A | 2/2013 |
| JP | 2014-125609 A | 7/2014 |
| JP | 2014-125610 A | 7/2014 |
| WO | 2013/018651 A1 | 2/2013 |
| WO | 2014/013982 A1 | 1/2014 |
| WO | 2014/196552 A1 | 12/2014 |

OTHER PUBLICATIONS

International Search Report dated Jan. 19, 2016 in PCT/JP2015/078929 filed Oct. 13, 2015.
Extended European Search Report dated Apr. 16, 2018 in Patent Application No. 15850872.1 citing reference AO therein, 6 pages.

\* cited by examiner

*Primary Examiner* — Christopher M Rodd
(74) *Attorney, Agent, or Firm* — Oblon, McClelland, Maier & Neustadt, L.L.P.

(57) ABSTRACT

A resin composition suitable for an optical compensation film, an optical compensation film using the same, which is excellent in the retardation characteristics and wavelength dispersion characteristics, and a production method of an optical compensation film. A resin composition containing, as resin components, from 30 to 99 wt % of a cellulose-based resin represented by the following formula (1) and from 1 to 70 wt % of a cinnamic acid ester copolymer:

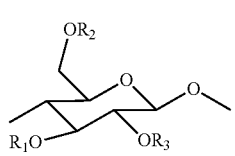

(1)

where each of $R_1$, $R_2$ and $R_3$ independently represents hydrogen or a substituent having a carbon number of 1 to 12.

29 Claims, No Drawings

RESIN COMPOSITION AND OPTICAL COMPENSATION FILM USING SAME

TECHNICAL FIELD

The present invention relates to a resin composition and an optical compensation film using the same. More specifically, the present invention relates to a resin composition and an optical compensation film for a liquid crystal display excellent in the retardation characteristics and wavelength dispersion characteristics.

BACKGROUND ART

A liquid crystal display is being widely used as a most important display device in the multimedia society, including applications ranging from a cellular phone to a computer monitor, a notebook computer and a television set. In a liquid crystal display, many optical films are used so as to enhance display characteristics. Among others, an optical compensation film plays a great role in, for example, improving the contrast or compensating the color tone when the display is viewed from the front or oblique direction.

The liquid crystal display includes many systems such as vertical alignment type (VA-LCD), in-plane switching liquid crystal display (IPS-LCD), super twisted nematic liquid crystal display (STN-LCD), reflective liquid crystal display and transflective liquid crystal display, and an optical compensation film suited for the display is required.

As conventional optical compensation films, a stretched film of a cellulose-based resin, a polycarbonate, a cyclic polyolefin, etc. is used. In particular, a film composed of a cellulose-based resin, such as triacetyl cellulose film, is being widely used because of its good adhesiveness to polyvinyl alcohol as a polarizer.

However, the optical compensation film composed of a cellulose-based resin has several problems. For example, although a cellulose-based resin film is processed into an optical compensation film having a retardation value appropriate to various displays by adjusting the stretching conditions, the three-dimensional refractive indices of a film obtained by uniaxial or biaxial stretching of a cellulose-based resin film are ny≥nx>nz and in order to produce an optical compensation film having other three-dimensional refractive indices, e.g., three-dimensional refractive indices of ny>nz>nx or ny=nz>nx, a special stretching method of, for example, adhering a heat-shrinkable film to one surface or both surfaces of the film and heating and stretching the laminate to apply a shrinking force in the thickness direction of the polymer film is required, which makes it difficult to control the refractive index (retardation value) (see, for example, Patent Documents 1 to 3). Here, nx indicates the refractive index in the fast axis direction (the direction having a minimum refractive index) in the film plane, ny indicates the refractive index in the slow axis direction (the direction having a maximum refractive index) in the film plane, and nz indicates the refractive index outside the film plane (thickness direction).

In addition, a cellulose-based resin film is generally produced by a solvent casting method, and the cellulose-based resin film deposited by a casting method has an out-of-plane retardation (Rth) of about 40 nm in the film thickness direction and therefore, raises a problem, such as occurrence of a color shift in an IPS-mode liquid crystal display, etc. Here, the out-of-plane retardation (Rth) is a retardation value represented by the following formula:

$$Rth=[(nx+ny)/2-nz] \times d$$

(wherein nx represents the refractive index in the fast axis direction in the film plane, ny represents the refractive index in the slow axis direction in the film plane, nz represents the refractive index outside the film plane, and d represents the film thickness).

A retardation film composed of a fumaric acid ester-based resin has also been proposed (see, for example, Patent Document 4).

However, the three-dimensional indices of a stretched film composed of a fumaric acid ester-based resin are nz>ny>nx and, for example, lamination to another optical compensation film, etc. is needed for obtaining an optical compensation film exhibiting the above-described three-dimensional refractive indices.

As the optical compensation film exhibiting the above-described three-dimensional refractive indices, a resin composition and an optical compensation film using the same have been proposed (see, for example, Patent Documents 5 to 7).

The optical compensation films of Patent Documents 5 to 7 have an excellent performance as an optical compensation film, but in order to develop the intended Re, a film thickness larger than that in the present invention is necessary. In addition, the retardation film is generally used also as an antireflection layer of a reflective liquid crystal display device, a touch panel or an organic EL and in these uses, a retardation film giving a larger retardation in the longer wavelength region (hereinafter, referred to as "reverse wavelength dispersion film") is required, but Patent Documents 5 to 7 are silent on use as a reverse wavelength dispersion film.

In the case of using a reverse wavelength dispersion film as the antireflection film, the retardation is preferably about ¼ of the measured wavelength λ, and a ratio Re(450)/Re(550) between a retardation at 450 nm and a retardation at 550 nm is preferably close to 0.81. In addition, with the consideration of thinning of the display device, the reverse wavelength dispersion film used is also required to be thin. To satisfy these required characteristics, various retardation films are being developed.

As such a retardation film, a retardation plate having a reverse wavelength dispersion property, obtained by blending a polymer having a positive intrinsic birefringence and a polymer having a negative intrinsic birefringence, is disclosed (see, for example, Patent Document 8). In this patent document, a norbornene-based polymer as a polymer having a positive intrinsic birefringence, a styrene-maleic anhydride copolymer as a polymer having a negative intrinsic birefringence, and a composition obtained by blending these polymers are disclosed, but in the retardation plate using the composition, Re and Nz do not satisfy the preferable relationship as the retardation characteristics of a retardation film.

RELATED ART

Patent Document

Patent Document 1: Japanese Patent No. 2,818,983
Patent Document 2: JP-A-H5-297223
Patent Document 3: JP-A-H5-323120
Patent Document 4: JP-A-2008-64817
Patent Document 5: JP-A-2013-28741
Patent Document 6: JP-A-2014-125609

Patent Document 7: JP-A-2014-125610
Patent Document 8: JP-A-2001-337222

DISCLOSURE OF INVENTION

Problem that the Invention is to Solve

The present invention has been made by taking into account the above-described problems, and an object of the present invention is to provide a resin composition suitable for an optical compensation film, and an optical compensation film using the same, which is excellent in the retardation characteristics and wavelength dispersion characteristics.

Problems to be Solved by the Invention

As a result of intensive studies to solve the problems above, the present inventors have found that those problems can be solved by a resin composition containing a specific cellulose-based resin and a specific cinnamic acid ester copolymer, an optical compensation film using the same, and a production method thereof. The present invention has been accomplished based on this finding.

That is, the gist of the present invention resides in the following [1] to [29].

[1] A resin composition, comprising: as resin components, from 30 to 99 wt % of a cellulose-based resin represented by the following formula (1); and from 1 to 70 wt % of a cinnamic acid ester copolymer:

[Chem. 1]

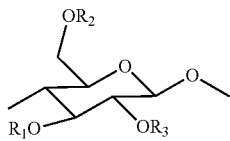

(1)

(wherein each of $R_1$, $R_2$ and $R_3$ independently represents hydrogen or a substituent having a carbon number of 1 to 12).

[2] The resin composition described in [1], wherein the cinnamic acid ester copolymer contains from 10 to 90 mol % of an alkoxycinnamic acid ester residue unit represented by the following formula (2):

[Chem. 2]

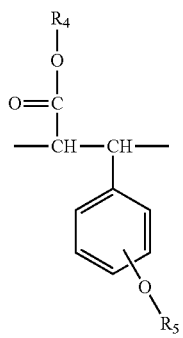

(2)

(wherein each of $R_4$ and $R_5$ independently represents an alkyl group having a carbon number of 1 to 12).

[3] The resin composition described in [2], wherein the cinnamic acid ester copolymer contains from 5 to 50 mol % of a fumaric acid monoester residue unit represented by the following formula (3), from 0 to 85 mol % of a fumaric acid diester residue unit represented by the following formula (4), and from 10 to 90 mol % of an alkoxycinnamic acid ester residue unit represented by the following formula (2):

[Chem. 3]

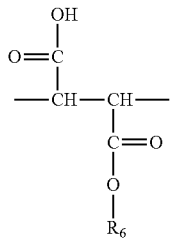

(3)

(wherein $R_6$ represents an alkyl group having a carbon number of 1 to 12);

[Chem. 4]

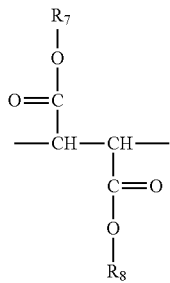

(4)

(wherein each of $R_7$ and $R_8$ independently represents an alkyl group having a carbon number of 1 to 12); and

[Chem. 5]

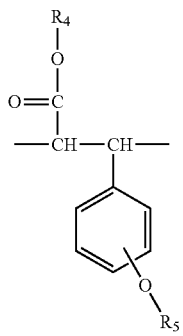

(2)

(wherein each of $R_4$ and $R_5$ independently represents an alkyl group having a carbon number of 1 to 12).

[4] The resin composition described in [2], wherein the cinnamic acid ester copolymer contains from 10 to 50 mol % of a fumaric acid monoester residue unit represented by the following formula (3), from 0 to 60 mol % of a fumaric acid diester residue unit represented by the following formula (4), and from 30 to 90 mol % of an alkoxycinnamic acid ester residue unit represented by the following formula (2):

[Chem. 6]

(3)

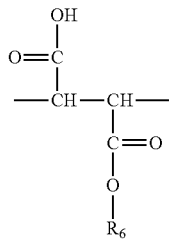

(wherein $R_6$ represents an alkyl group having a carbon number of 1 to 12);

[Chem. 7]

(4)

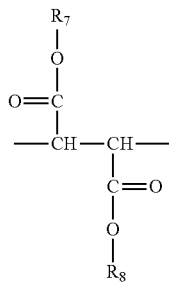

(wherein each of $R_7$ and $R_8$ independently represents an alkyl group having a carbon number of 1 to 12); and

[Chem. 8]

(2)

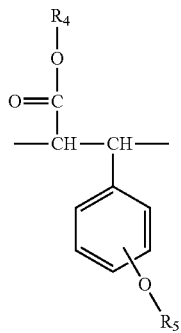

(wherein each of $R_4$ and $R_5$ independently represents an alkyl group having a carbon number of 1 to 12).

[5] The resin composition as described in [2] or [3], wherein the cinnamic acid ester copolymer contains:

from 5 to 50 mol % of a fumaric acid monoester residue unit selected from a monomethyl fumarate residue unit, a monoethyl fumarate residue unit, a monoisopropyl fumarate residue unit, a mono-n-propyl fumarate residue unit, a mono-n-butyl fumarate residue unit, a mono-tert-butyl fumarate residue unit, and a mono-2-ethylhexyl fumarate residue unit;

from 0 to 85 mol % of a fumaric acid diester residue unit selected from a dimethyl fumarate residue unit, a diethyl fumarate residue unit, a diisopropyl fumarate residue unit, a di-n-propyl fumarate residue unit, a di-n-butyl fumarate residue unit, a di-tert-butyl fumarate residue unit, and a di-2-ethylhexyl fumarate residue unit; and from 10 to 90 mol % of an alkoxycinnamic acid ester residue unit represented by the following formula (2):

[Chem. 9]

(2)

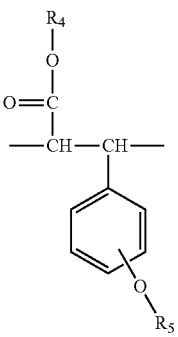

(wherein each of $R_4$ and $R_5$ independently represents an alkyl group having a carbon number of 1 to 12).

[6] The resin composition as described in [2], wherein the cinnamic acid ester copolymer contains:

from 5 to 85 mol % of a fumaric acid diester residue unit represented by the following formula (4);

from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7) and a methacrylic acid amide residue unit represented by the following formula (8); and from 10 to 90 mol % of an alkoxycinnamic acid ester residue unit represented by the following formula (2):

[Chem. 10]

(4)

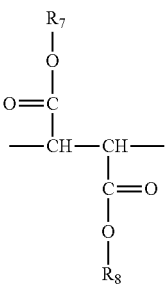

(wherein each of $R_7$ and $R_8$ independently represents an alkyl group having a carbon number of 1 to 12);

[Chem. 11]

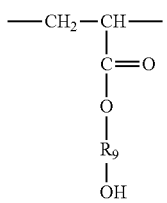
(5)

[Chem. 12]

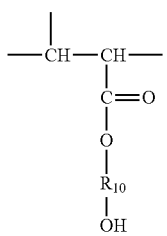
(6)

[Chem. 13]

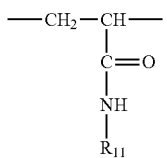
(7)

[Chem. 14]

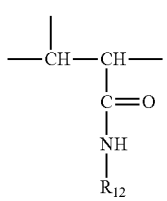
(8)

(wherein each of $R_9$, $R_{10}$, $R_{11}$ and $R_{12}$ independently represents an alkyl group having a carbon number of 1 to 12, an alkylene group or an ether group); and

[Chem. 15]

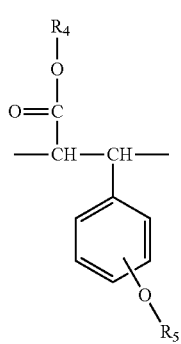
(2)

(wherein each of $R_4$ and $R_5$ independently represents an alkyl group having a carbon number of 1 to 12).

[7] The resin composition as described in [2], wherein the cinnamic acid ester copolymer contains:
from 5 to 65 mol % of a fumaric acid diester residue unit represented by the following formula (4);
from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8); and
from 30 to 90 mol % of an alkoxycinnamic acid ester residue unit represented by the following formula (2):

[Chem. 16]

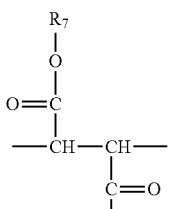
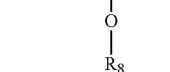
(4)

(wherein each of $R_7$ and $R_8$ independently represents an alkyl group having a carbon number of 1 to 12);

[Chem. 17]

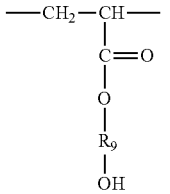
(5)

[Chem. 18]

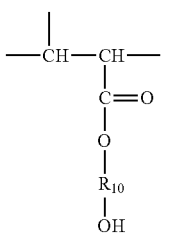
(6)

[Chem. 19]

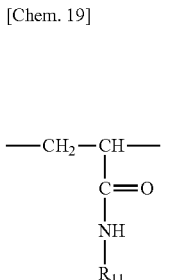
(7)

-continued

[Chem. 20]

(8)

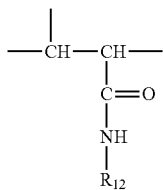

(wherein each of $R_9$, $R_{10}$, $R_{11}$ and $R_{12}$ independently represents an alkyl group having a carbon number of 1 to 12, an alkylene group or an ether group); and

[Chem. 21]

(2)

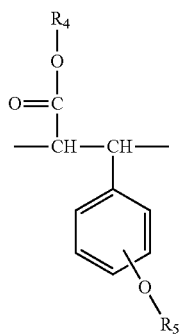

(wherein each of $R_4$ and $R_5$ independently represents an alkyl group having a carbon number of 1 to 12).

[8] The resin composition described in [1],
wherein the cinnamic acid ester copolymer contains 20 mol % or more of a fumaric acid diester residue unit represented by the following formula (4) and 5 mol % or more of a substituted cinnamic acid ester residue unit represented by the following formula (9):

[Chem. 22]

(4)

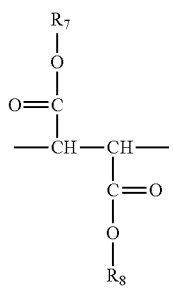

(wherein each of $R_7$ and $R_8$ independently represents an alkyl group having a carbon number of 1 to 12); and

[Chem. 23]

(9)

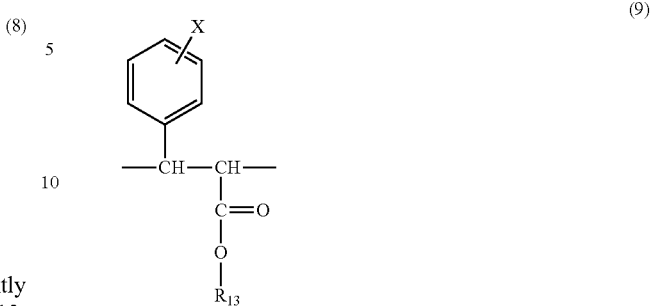

(wherein $R_{13}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group).

[9] The resin composition described in [1],
wherein the cinnamic acid ester copolymer contains 20 mol % or more of a fumaric acid diester residue unit represented by the following formula (4) and 5 mol % or more of a p-position-substituted cinnamic acid ester residue unit represented by the following formula (10):

[Chem. 24]

(4)

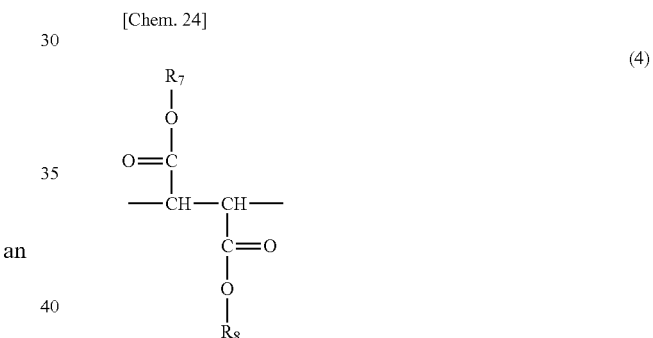

(wherein each of $R_7$ and $R_8$ independently represents an alkyl group having a carbon number of 1 to 12); and

[Chem. 25]

(10)

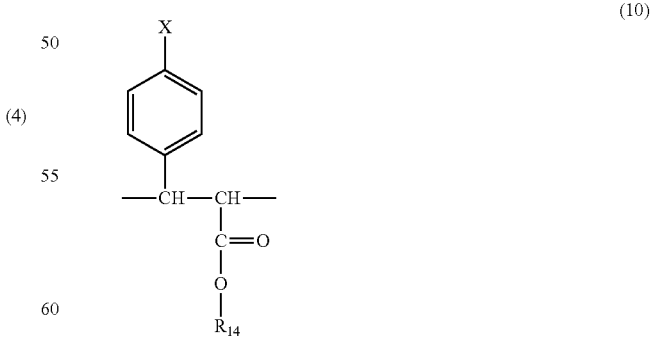

(wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group).

[10] The resin composition described in [1], wherein the cinnamic acid ester copolymer contains from 20 to 90 mol % of a fumaric acid diester residue unit represented by the following formula (4), from 5 to 75 mol % of a p-position-substituted cinnamic acid ester residue unit represented by the following formula (10), and from 5 to 30 mol % of a fumaric acid monoester residue unit represented by the following formula (3):

[Chem. 26]

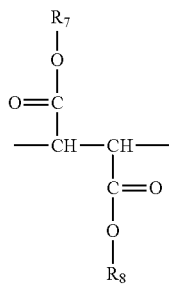

(4)

(wherein each of $R_7$ and $R_8$ independently represents an alkyl group having a carbon number of 1 to 12);

[Chem. 27]

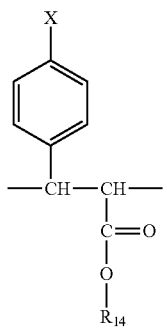

(10)

(wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group); and

[Chem. 28]

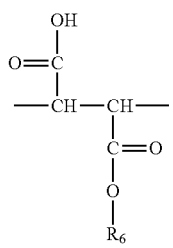

(3)

(wherein $R_6$ represents an alkyl group having a carbon number of 1 to 12).

[11] The resin composition described in [1], wherein the cinnamic acid ester copolymer is a cinnamic acid ester copolymer selected from the group consisting of:

a fumaric acid ester copolymer containing from 20 to 95 mol % of a diethyl fumarate residue unit, from 5 to 75 mol % of a p-position-substituted cinnamic acid ester residue unit represented by the following formula (10), and from 0 to 30 mol % of a fumaric acid monoester residue unit represented by the following formula (3);

a fumaric acid ester copolymer containing from 20 to 90 mol % of a diisopropyl fumarate residue unit, from 5 to 75 mol % of a p-position-substituted cinnamic acid ester residue unit represented by the following formula (10), and from 5 to 30 mol % of a fumaric acid monoester residue unit represented by the following formula (3);

and a fumaric acid ester copolymer containing from 20 to 90 mol % of a di-tert-butyl fumarate residue unit, from 5 to 75 mol % of a p-position-substituted cinnamic acid ester residue unit represented by the following formula (10), and from 5 to 30 mol % of a fumaric acid monoester residue unit represented by the following formula (3):

[Chem. 29]

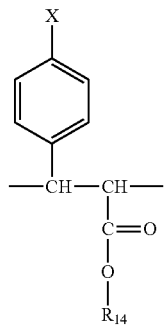

(10)

(wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group); and

[Chem. 30]

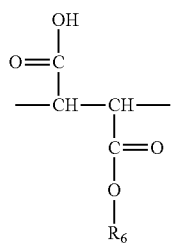

(3)

(wherein $R_6$ represents an alkyl group having a carbon number of 1 to 12).

[12] The resin composition described in [10] or [11], wherein the fumaric acid monoester residue unit recited in claim 10 or 11 is a fumaric acid monoester residue unit selected from the group consisting of a monomethyl fumarate residue unit, a monoethyl fumarate residue unit, a monoisopropyl fumarate residue unit, a mono-n-propyl fumarate residue unit, a mono-n-butyl fumarate residue unit, a mono-s-butyl fumarate residue unit, a mono-tert-butyl fumarate residue unit, and a mono-2-ethylhexyl fumarate residue unit.

[13] The resin composition described in [1], wherein the cinnamic acid ester copolymer is a cinnamic acid ester copolymer containing:

from 20 to 94.5 mol % of a fumaric acid diester residue unit represented by the following formula (4);

from 5 to 75 mol % of a p-position-substituted cinnamic acid ester residue unit represented by the following formula (10); and from 0.5 to 30 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8):

[Chem. 31]

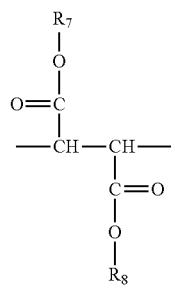

(4)

(wherein each of $R_7$ and $R_8$ independently represents an alkyl group having a carbon number of 1 to 12);

[Chem. 32]

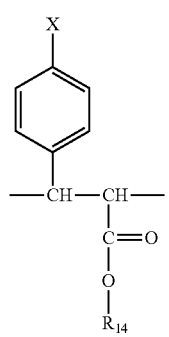

(10)

(wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group);

[Chem. 33]

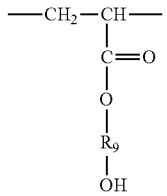

(5)

[Chem. 34]

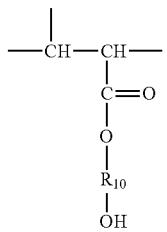

(6)

[Chem. 35]

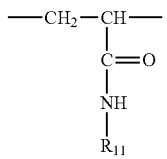

(7)

[Chem. 36]

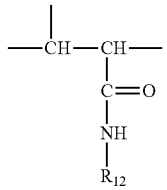

(8)

(wherein each of $R_9$, $R_{10}$, $R_{11}$ and $R_{12}$ independently represents an alkyl group having a carbon number of 1 to 12, an alkylene group or an ether group)

[14] The resin composition described in any one of [9] to [13], wherein the p-position-substituted cinnamic acid ester residue unit is selected from the group consisting of a methyl 4-nitrocinnamate residue unit, an ethyl 4-nitrocinnamate residue unit, an isopropyl 4-nitrocinnamate residue unit, an n-propyl 4-nitrocinnamate residue unit, an n-butyl 4-nitrocinnamate residue unit, a sec-butyl 4-nitrocinnamate residue unit, a tert-butyl 4-nitrocinnamate residue unit, a 2-ethylhexyl 4-nitrocinnamate residue unit, a methyl 4-fluorocinnamate residue unit, an ethyl 4-fluorocinnamate residue unit, an isopropyl 4-fluorocinnamate residue unit, an n-propyl 4-fluorocinnamate residue unit, an n-butyl 4-fluorocinnamate residue unit, a sec-butyl 4-fluorocinnamate residue unit, a tert-butyl 4-fluorocinnamate residue unit, a 2-ethylhexyl 4-fluorocinnamate residue unit, a methyl 4-chlorocinnamate residue unit, an ethyl 4-chlorocinnamate residue unit, an isopropyl 4-chlorocinnamate residue unit, an n-propyl 4-chlorocinnamate residue unit, an n-butyl 4-chlorocinnamate residue unit, a sec-butyl 4-chlorocinnamate residue unit, a tert-butyl 4-chlorocinnamate residue unit, a 2-ethylhexyl 4-chlorocinnamate residue unit, a methyl 4-bromocinnamate residue unit, an ethyl 4-bromocinnamate residue unit, an isopropyl 4-bromocinnamate residue unit, an n-propyl 4-bromocinnamate residue unit, an n-butyl 4-bromocinnamate residue unit, a sec-butyl 4-bromocinnamate residue unit, a tert-butyl 4-bromocinnamate residue unit, a 2-ethylhexyl 4-bromocinnamate residue unit, a methyl 4-iodocinnamate residue unit, an ethyl 4-iodocinnamate residue unit, an isopropyl 4-iodocinnamate residue unit, an n-propyl 4-iodocinnamate residue unit, an n-butyl 4-iodocinnamate residue unit, a sec-butyl 4-iodocinnamate residue unit, a tert-butyl 4-iodocinnamate residue unit, a 2-ethylhexyl 4-iodocinnamate residue unit, a methyl 4-cyanocinnamate residue unit, an ethyl 4-cyanocinnamate residue unit, an isopropyl 4-cyanocinnamate residue unit, an n-propyl 4-cyanocinnamate residue unit, an n-butyl 4-cyanocinnamate residue unit, a sec-butyl 4-cyanocinnamate residue unit, a tert-butyl 4-cyanocinnamate residue unit, a 2-ethylhexyl 4-cyanocinnamate residue unit, a methyl 4-sulfonate cinnamate residue unit, an ethyl 4-sulfonate cinnamate residue unit, an isopropyl 4-sulfonate cinnamate residue unit, an n-propyl 4-sulfonate cinnamate residue unit, an n-butyl 4-sulfonate cinnamate residue unit, a sec-butyl 4-sulfonate cinnamate residue unit, a tert-butyl 4-sulfonate cinnamate residue unit, a 2-ethylhexyl 4-sulfonate cinnamate residue unit, an ethyl 4-carboxylate cinnamate residue unit, an isopropyl 4-carboxylate cinnamate residue unit, an n-propyl 4-carboxylate cinnamate residue unit, an n-butyl 4-carboxylate cinnamate residue unit, a sec-butyl 4-carboxylate cinnamate residue unit, a tert-butyl 4-carboxylate cinnamate residue unit, a 2-ethylhexyl 4-carboxylate cinnamate residue unit, a methyl 4-phenylcinnamate residue unit, an ethyl 4-phenylcinnamate residue unit, an isopropyl 4-phenylcinnamate residue unit, an n-propyl 4-phenylcinnamate residue unit, an n-butyl 4-phenylcinnamate residue unit, a sec-butyl 4-phenylcinnamate residue unit, a tert-butyl 4-phenylcinnamate residue unit, and a 2-ethylhexyl 4-phenylcinnamate residue unit.

[15] The resin compound described in any one of [1] to [14], wherein the cellulose-based resin represented by formula (1) is a cellulose ether.

[16] The resin composition described in [15], wherein an etherification degree (substitution degree) of the cellulose ether is from 1.5 to 3.0.

[17] An optical compensation film, obtained using the resin composition described in any one of [1] to [16], wherein a thickness is from 5 to 200 μm.

[18] An optical compensation film, obtained using the resin composition described in any one of [1] to [16], wherein a thickness is from 20 to 60 μm.

[19] The optical compensation film described in [17] or [18], wherein an in-plane retardation (Re) represented by the following expression (1) is from 80 to 300 nm and a Nz coefficient represented by the following expression (2) is from 0.35 to 0.65:

$$Re = (ny - nx) \times d \quad (1)$$

$$Nz = (ny - nz)/(ny - nx) \quad (2)$$

(wherein nx represents a refractive index in a fast axis direction in a film plane, ny represents a refractive index in a slow axis direction in a film plane, nz represents a refractive index outside a film plane, and d represents the film thickness).

[20] The optical compensation film described in [17] or [18], wherein a in-plane retardation (Re) represented by expression (1) is from 50 to 300 nm and a Nz coefficient represented by expression (2) is from −0.2 to 0.2.

[21] The optical compensation film described in [17] or [18], wherein a in-plane retardation (Re) represented by expression (1) is from 0 to 20 nm and a out-of-plane retardation (Rth) represented by the following expression (3) is from −150 to 20 nm:

$$Rth = [(nx + ny)/2 - nz] \times d \quad (3)$$

(wherein nx represents a refractive index in a fast axis direction in a film plane, ny represents a refractive index in a slow axis direction in a film plane, nz represents a refractive index outside a film plane, and d represents the film thickness).

[22] The optical compensation film described in any one of [17] to [21], wherein a light transmittance is 85% or more.

[23] The optical compensation film described in any one of [17] to [22], wherein a haze is 1% or less.

[24] The optical compensation film described in any one of [17] to [23], wherein a ratio Re(450)/Re(550) between a retardation at 450 nm and a retardation at 550 nm is 0.60<Re(450)/Re(550)<1.05.

[25] The optical compensation film described in any one of [17] to [24], wherein a ratio Re(589) (nm)/film thickness (μm) between a retardation at 589 nm and a film thickness is 4.0 nm/μm or more.

[26] A method for producing the optical compensation film described in any one of [17] to [25], comprising;
dissolving, in a solvent, a resin composition containing, as resin components, from 30 to 99 wt % of a cellulose-based resin represented by the following formula (1) and from 1 to 70 wt % of a cinnamic acid ester copolymer;
casting the obtained resin solution on a base material; and
after drying, separating the resulting film from the base material:

[Chem. 37]

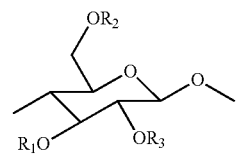

(1)

(wherein each of $R_1$, $R_2$ and $R_3$ independently represents hydrogen or a substituent having a carbon number of 1 to 12).

[27] The production method of an optical compensation film described in [26], wherein when the cellulose-based resin represented by formula (1) is a cellulose ether, an etherification degree (substitution degree) is from 1.5 to 3.0.

[28] A method for producing the optical compensation film described in [19] or [20], comprising:
subjecting a film having a thickness of 10 to 200 μm obtained by casting, to uniaxial stretching or unbalanced biaxial stretching.

[29] A method for producing the optical compensation film as described in [19] or [20], comprising:
subjecting a film having a thickness of 30 to 100 μm obtained by casting, to uniaxial stretching or unbalanced biaxial stretching.

The present invention is described in detail below.

The resin composition of the present invention contains, as resin components, from 30 to 99 wt % of a cellulose-based resin represented by the following formula (1) and from 1 to 70 wt % of a cinnamic acid ester copolymer:

[Chem. 38]

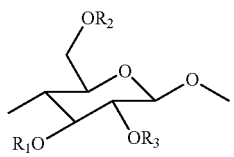
(1)

(wherein each of $R_1$, $R_2$ and $R_3$ independently represents hydrogen or a substituent having a carbon number of 1 to 12).

The cellulose-based resin of the present invention includes, for example, a cellulose ether, a cellulose ester, a cellulose ether ester, and a cellulose acylate. The resin composition of the present invention may contain one kind or two or more kinds of these cellulose-based resins.

From the viewpoint that the cellulose-based resin of the present invention has excellent mechanical properties and exhibits excellent formability at the time of film production, a number average molecular weight (Mn) as determined in terms of standard polystyrene from an elution curve measured by gel permeation chromatography (GPC) is preferably from $1 \times 10^3$ to $1 \times 10^6$, more preferably from $5 \times 10^3$ to $2 \times 10^5$.

The cellulose-based resin of the present invention is preferably a cellulose ether because of excellent compatibility with a cinnamic acid ester copolymer, large in-plane retardation Re and excellent stretchability.

The cellulose ether that is preferred as the cellulose-based resin for use in the optical compensation film of the present invention is described below.

The cellulose ether as the cellulose-based resin of the present invention is a polymer obtained by linearly polymerizing β-glucose units and is a polymer in which hydroxyl groups at the 2-position, 3-position and 6-position of the glucose unit are etherified in part or in whole. The cellulose ether for use in the present invention includes, for example, an alkyl cellulose such as methyl cellulose, ethyl cellulose and propyl cellulose; a hydroxyalkyl cellulose such as hydroxyethyl cellulose and hydroxypropyl cellulose; an aralkyl cellulose such as benzyl cellulose and trityl cellulose; a cyanoalkyl cellulose such as cyan ethyl cellulose; a carboxyalkyl cellulose such as carboxymethyl cellulose and carboxyethyl cellulose; a carboxyalkylalkyl cellulose such as carboxymethylmethyl cellulose and carboxymethylethyl cellulose; and an aminoalkyl cellulose such as aminoethyl cellulose.

A substitution degree (etherification degree) of substituting, though an oxygen atom, the hydroxyl group of cellulose in the cellulose ether means a ratio at which a hydroxyl group of cellulose is etherified (in the case of 100% etherification, the substitution degree is 1) at each of the 2-position, 3-position and 6-position and in view of solubility, compatibility and stretchability, the total degree of substitution DS of an ether group is preferably from 1.5 to 3.0 ($1.5 \leq DS \leq 3.0$), more preferably from 1.8 to 2.8. In view of solubility and compatibility, the cellulose ether preferably has a substituent having a carbon number of 1 to 12. The substituent having a carbon number of 1 to 12 includes, for example, a methyl group, an ethyl group, a propyl group, a butyl group, a pentyl group, a hexyl group, a heptyl group, an octyl group, a decanyl group, a dodecanyl group, an isobutyl group, a tert-butyl group, a cyclohexyl group, a phenonyl group, a benzyl group, and a naphthyl group. Among these, in view of solubility and compatibility, a methyl group, an ethyl group, a propyl group, a butyl group and a pentyl group, which are an alkyl group having a carbon number of 1 to 5, are preferred. The cellulose ether of cellulosed-based polymer used in the present invention may have only one kind of an ether group or two or more kinds of ether groups and may also have an ester group, in addition to the ether group.

The cellulose ether is generally synthesized by alkali-decomposing cellulose pulp obtained from wood or cotton and etherifying the alkali-decomposed cellulose pulp. As the alkali, for example, a hydroxide of an alkali metal such as lithium, potassium and sodium, or ammonia may be used. The alkalis above are generally used in the form of an aqueous solution. The alkalized cellulose pulp is then put into contact with an etherifying agent used according to the type of the cellulose ether, and thereby etherified. The etherifying agent includes, for example, an alkyl halide such as methyl chloride and ethyl chloride; an aralkyl halide such as benzyl chloride and trityl chloride; a halocarboxylic acid such as monochloroacetic acid and monochloropropionic acid; and an alkylene oxide such as ethylene oxide, propylene oxide and butylene oxide. One of these etherifying agents may be used alone, or two or more thereof may be used in combination.

If desired, after the completion of reaction, a depolymerization treatment with hydrogen chloride, hydrogen bromide, hydrochloric acid, sulfuric acid, etc. may be performed so as to adjust the viscosity.

The cinnamic acid ester copolymer contained in the resin composition of the present invention (hereinafter, referred to as the cinnamic acid ester polymer) is a copolymer containing a cinnamic acid ester residue unit, and the residue unit includes, for example, a cinnamic acid ester residue unit where the benzene ring in the cinnamic acid ester residue unit does not have a substituent, such as methyl cinnamate residue unit, ethyl cinnamate residue unit and isopropyl cinnamate residue unit; a cinnamic acid ester residue unit where the benzene ring has an electron-donating substituent, such as aminocinnamic acid ester residue unit, alkylcinnamic acid ester residue unit and alkoxycinnamic acid ester residue unit; and a cinnamic acid ester residue unit where the benzene ring has an electron-withdrawing substituent, such as substituted cinnamic acid ester residue unit represented by the following formula (9):

[Chem. 39]

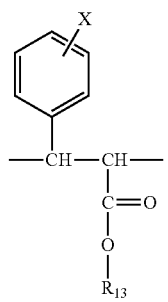
(9)

(wherein $R_{13}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group).

In the present invention, the cinnamic acid ester copolymer is preferably a cinnamic acid ester copolymer containing 5 mol % or more of a cinnamic acid ester residue unit with the benzene ring having an electron-donating substituent or a cinnamic acid ester residue unit with the benzene ring having an electron-withdrawing substituent, because when used as a retardation film, a higher-performance retardation film is obtained.

In the present invention, the cinnamic acid ester copolymer is more preferably a cinnamic acid ester copolymer containing from 10 to 90 mol % of an alkoxycinnamic acid ester residue unit represented by the following formula (2):

[Chem. 40]

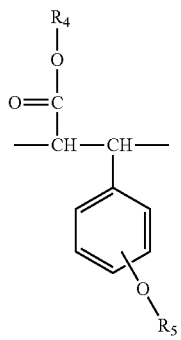

(2)

(wherein each of $R_4$ and $R_5$ independently represents an alkyl group having a carbon number of 1 to 12).

In the present invention, the retardation developability is more enhanced when the content of the alkoxycinnamic acid ester residue unit is 10 mol % or more, and the compatibility is more enhanced when it is 90 mol % or less. That is, in the present invention, when the cinnamic acid ester copolymer is a cinnamic acid ester copolymer containing from 10 to 90 mol % of an alkoxycinnamic acid ester residue unit, the compatibility of the copolymer becomes higher and in the case of using the resin composition according to the present invention as an optical compensation film, Re is more enhanced.

$R_4$ that is an ester substituent of the alkoxycinnamic acid ester residue unit represented by formula (2) in the cinnamic acid ester copolymer is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Among these, in view of compatibility with the cellulose resin, a methyl group, an ethyl group, a propyl group and a butyl group, which are an alkyl group having a carbon number of 1 to 4, are preferred. $R_5$ that is an ester substituent is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclo pentyl group, and a cyclohexyl group. Among these, in view of solubility and compatibility, a methyl group, an ethyl group, a propyl group and a butyl group, which are an alkyl group having a carbon number of 1 to 4, are preferred. In view of solubility and compatibility, the alkoxycinnamic acid ester residue unit represented by formula (2) is preferably an alkoxycinnamic acid ester residue unit selected from a methyl 4-methoxycinnamate residue, an ethyl 4-methoxycinnamate residue, an isopropyl 4-methoxycinnamate residue, an n-propyl 4-methoxycinnamate residue, an n-butyl 4-methoxycinnamate residue, a sec-butyl 4-methoxycinnamate residue, a tert-butyl 4-methoxycinnamate residue, a 2-ethylhexyl 4-methoxycinnamate residue, a methyl 4-ethoxycinnamate residue, an ethyl 4-ethoxycinnamate residue, an isopropyl 4-ethoxycinnamate residue, an n-propyl 4-ethoxycinnamate residue, an n-butyl 4-ethoxycinnamate residue, a sec-butyl 4-ethoxycinnamate residue, a tert-butyl 4-ethoxycinnamate residue, a 2-ethylhexyl 4-ethoxycinnamate residue, a methyl 4-isopropoxycinnamate residue, an ethyl 4-isopropoxycinnamate residue, an isopropyl 4-isopropoxycinnamate residue, an n-propyl 4-isopropoxycinnamate residue, an n-butyl 4-isopropoxycinnamate residue, a sec-butyl 4-isopropoxycinnamate residue, a tert-butyl 4-isopropoxycinnamate residue, a 2-ethylhexyl 4-isopropoxycinnamate residue, a methyl 4-n-propoxycinnamate residue, an ethyl 4-n-propoxycinnamate residue, an isopropyl 4-n-propoxycinnamate residue, an n-propyl 4-n-propoxycinnamate residue, an n-butyl 4-n-propoxycinnamate residue, a sec-butyl 4-n-propoxycinnamate residue, a tert-butyl 4-n-propoxycinnamate residue, a 2-ethylhexyl 4-n-propoxycinnamate residue, a methyl 4-n-butoxycinnamate residue, an ethyl 4-n-butoxycinnamate residue, an isopropyl 4-n-butoxycinnamate residue, an n-propyl 4-n-butoxycinnamate residue, an n-butyl 4-n-butoxycinnamate residue, a sec-butyl 4-n-butoxycinnamate residue, a tert-butyl 4-n-butoxycinnamate residue, a 2-ethylhexyl 4-n-butoxycinnamate residue, a methyl 4-sec-butoxycinnamate residue, an ethyl 4-sec-butoxycinnamate residue, an isopropyl 4-sec-butoxycinnamate residue, an n-propyl 4-sec-butoxycinnamate residue, an n-butyl 4-sec-butoxycinnamate residue, a sec-butyl 4-sec-butoxycinnamate residue, a tert-butyl 4-sec-butoxycinnamate residue, a 2-ethylhexyl 4-sec-butoxycinnamate residue, a methyl 4-tert-butoxycimnamate residue, an ethyl 4-tert-butoxycinnamate residue, an isopropyl 4-tert-butoxycinnamate residue, an n-propyl 4-tert-butoxycinnamate residue, an n-butyl 4-tert-butoxycinnamate residue, a sec-butyl 4-tert-butoxycinnamate residue, a tert-butyl 4-tert-butoxycinnamate residue, a 2-ethylhexyl 4-tert-butoxycinnamate residue, a methyl 3-methoxycinnamate residue, an ethyl 3-methoxycinnamate residue, an isopropyl 3-methoxycinnamate residue, an n-propyl 3-methoxycinnamate residue, an n-butyl 3-methoxycinnamate residue, a see-butyl 3-methoxycinnamate residue, a tert-butyl 3-methoxycinnamate residue, a 2-ethylhexyl 3-methoxycinnamate residue, a methyl 3-ethoxycinnamate residue, an ethyl 3-ethoxycinnamate residue, an isopropyl 3-ethoxycinnamate residue, an n-propyl 3-ethoxycinnamate residue, an n-butyl 3-ethoxycinnamate residue, a sec-butyl 3-ethoxycinnamate residue, a tert-butyl 3-ethoxycinnamate residue, a 2-ethylhexyl 3-ethoxycinnamate residue, a methyl 3-isopropoxycinnamate residue, an ethyl 3-isopropoxycinnamate residue, an isopropyl 3-isopropoxycinnamate residue, an n-propyl 3-isopropoxycinnamate residue, an n-butyl 3-isopropoxycinnamate residue, a sec-butyl 3-isopropoxycinnamate residue, a tert-butyl 3-isopropoxycinnamate residue, a 2-ethylhexyl 3-isopropoxycinnamate residue, a methyl 3-n- propoxycinnamate residue, an ethyl 3-n-propoxycinnamate residue, an isopropyl 3-n-propoxycinnamate residue, an n-propyl 3-n-propoxycinnamate residue, an n-butyl 3-n-propoxycinnamate residue, a sec-butyl 3-n-propoxycinnamate residue, a tert-butyl 3-n-propoxycinnamate residue, a 2-ethylhexyl 3-n-propoxycinnamate residue, a methyl 3-n-butoxycinnamate residue, an ethyl 3-n-butoxycinnamate residue, an isopropyl 3-n-butoxycinnamate residue, an n-propyl 3-n-butoxycinnamate residue, an n-butyl 3-n-butoxycinnamate residue, a sec-butyl 3-n-butoxycinnamate residue, a tert-butyl 3-n-butoxycinnamate residue, a 2-ethylhexyl 3-n-butoxycinnamate residue, a methyl 3-sec-butoxycinnamate residue, an ethyl 3-sec-butoxycinnamate residue, an isopropyl 3-sec-butoxycinnamate residue, an n-propyl 3-sec-butoxycinnamate residue, an n-butyl 3-sec-butoxycinnamate residue, a sec-butyl 3-sec-butoxycinnamate residue, a tert-butyl 3-sec-butoxycinnamate residue, a 3-ethylhexyl 3-sec-butoxycinnamate residue, a methyl 3-tert-butoxycinnamate residue, an ethyl 3-tert-butoxycinnamate residue, an isopropyl 3-tert-butoxycinnamate residue, an n-propyl 3-tert-butoxycinnamate residue, an n-butyl 3-tert-butoxycinnamate residue, a sec-butyl 3-tert-butoxycinnamate residue, a tert-butyl 3-tert-butoxycinnamate residue, a 2-ethylhexyl 3-tert-butoxycinnamate residue, a methyl 2-methoxycinnamate residue, an ethyl 2-methoxycinnamate residue, an isopropyl 2-methoxycinnamate residue, an n-propyl 2-methoxycinnamate residue, an n-butyl 2-methoxycinnamate residue, a sec-butyl 2-methoxycinnamate residue, a tert-butyl 2-methoxycinnamate residue, a 2-ethylhexyl 2-methoxycinnamate residue, a methyl 2-ethoxycinnamate residue, an ethyl 2-ethoxycinnamate residue, an isopropyl 2-ethoxycinnamate residue, an n-propyl 2-ethoxycinnamate residue, an n-butyl 2-ethoxycinnamate residue, a sec-butyl 2-ethoxycinnamate residue, a tert-butyl 2-ethoxycinnamate residue, a 2-ethyhexyl 2-ethoxycinnamate residue, a methyl 2-isopropoxycinnamate residue, an ethyl 2-isopropoxycinnamate residue, an isopropyl 2-isopropoxycinnamate residue, an n-propyl 2-isopropoxycinnamate residue, an n-butyl 2-isopropoxycinnamate residue, a sec-butyl 2-isopropoxycinnamate residue, a tert-butyl 2-isopropoxycinnamate residue, a 2-ethylhexyl 2-isopropoxycinnamate residue, a methyl 2-n-propoxycinnamate residue, an ethyl 2-n-propoxycinnamate residue, an isopropyl 2-n-propoxycinnamate residue, an n-propyl 2-n-propoxycinnamate residue, an n-butyl 2-n-propoxycinnamate residue, a sec-butyl 2-n-propoxycinnamate residue, a tert-butyl 2-n-propoxycinnamate residue, a 2-ethylhexyl 2-n-propoxycinnamate residue, a methyl 2-n-butoxycinnamate residue, an ethyl 2-n-butoxycinnamate residue, an isopropyl 2-n-butoxycinnamate residue, an n-propyl 2-n-butoxycinnamate residue, an n-butyl 2-n-butoxycinnamate residue, a sec-butyl 2-n-butoxycinnamate residue, a tert-butyl 2-n-butoxycinnamate residue, a 2-ethylhexyl 2-n-butoxycinnamate residue, a methyl 2-sec-butoxycinnamate residue, an ethyl 2-sec-butoxycinnamate residue, an isopropyl 2-sec-butoxycinnamate residue, an n-propyl 2-sec-butoxycinnamate residue, an n-butyl 2-sec-butoxycinnamate residue, a sec-butyl 2-sec-butoxycinnamate residue, a tert-butyl 2-sec-butoxycinnamate residue, a 2-sec-butoxycinnamate residue, a methyl 2-tert-butoxycinnamate residue, an ethyl 2-tert-butoxycinnamate residue, an isopropyl 2-tert-butoxycinnamate residue, an n-propyl 2-tert-butoxycinnamate residue, an n-butyl 2-tert-butoxycinnamate residue, a sec-butyl 2-tert-butoxycinnamate residue, a tert-butyl 2-tert-butoxycinnamate residue, and a 2-ethylhexyl 2-tert-butoxycinnamate residue.

In the present invention, in the case where the cinnamic acid ester copolymer contains an alkoxycinnamic acid ester residue unit and a fumaric acid monoester residue unit, the cinnamic acid ester copolymer preferably contains from 5 to 50 mol % of a fumaric acid monoester residue unit represented by the following formula (3), from 0 to 85 mol % of a fumaric acid diester residue unit represented by the following formula (4), and from 10 to 90 mol % of an alkoxycinnamic acid ester residue unit represented by formula (2), and most preferably contains from 10 to 50 mol % of a fumaric acid monoester residue unit represented by the following formula (3), from 0 to 60 mol % of a fumaric acid diester residue unit represented by the following formula (4), and from 30 to 90 mol % of an alkoxycinnamic acid ester residue unit represented by formula (2):

[Chem. 41]

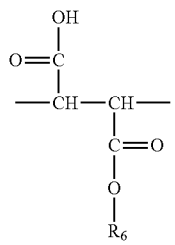

(3)

(wherein $R_6$ represents an alkyl group having a carbon number of 1 to 12); and

[Chem. 42]

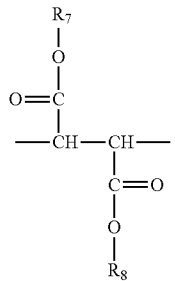

(4)

(wherein each of $R_7$ and $R_8$ independently represents an alkyl group having a carbon number of 1 to 12).

In the present invention, in the case where the cinnamic acid ester copolymer contains an alkoxycinnamic acid ester residue unit, when the content of the fumaric acid monoester residue unit is more than 5 mol %, a resin having more excellent compatibility is obtained, and when the content of the residue unit above is from 5 to 50 mol %, a resin having higher developability of retardation characteristics and more excellent compatibility is obtained.

In the present invention, in the case where the cinnamic acid ester copolymer has a fumaric acid monoester residue unit represented by formula (3), $R_6$ that is an ester substituent of the residue unit is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Among these, in view of compatibility with the cellulose resin, a methyl group, an ethyl group, a propyl group and a butyl group, which are an alkyl group having a carbon number of 1 to 4, are preferred. The fumaric acid monoester residue unit represented by formula (3) includes, for example, a monomethyl fumarate residue, a monoethyl fumarate residue, a mono-n-propyl fumarate residue, a monoisopropyl fumarate residue, a mono-n-butyl fumarate residue, a mono-s-butyl fumarate residue, a mono-tert-butyl fumarate residue, a mono-n-pentyl fumarate residue, a mono-s-pentyl fumarate residue, a mono-tert-pentyl fumarate residue, a mono-n-hexyl fumarate residue, a mono-s-hexyl fumarate residue, a mono-tert-hexyl fumarate residue, a mono-2-ethylhexyl fumarate, a monocyclopropyl fumarate residue, a monocyclopentyl fumarate residue, and a monocyclohexyl funmarate residue. Among these, in view of good compatibility with the cellulose-based resin, a fumaric acid monoester residue unit selected from a monomethyl fumarate residue unit, a monoethyl fumarate residue unit, a monoisopropyl fumarate residue unit, a mono-n-propyl fumarate residue unit, a mono-n-butyl fumarate residue unit, a mono-s-butyl fumarate residue unit, and a mono-tert-butyl fumarate residue unit is preferred.

In the present invention, in the case where the cinnamic acid ester copolymer has a fumaric acid diester residue unit represented by formula (4), $R_7$ and $R_8$ that are an ester substituent of the residue unit are an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Among these, in view of compatibility with the cellulose resin, a methyl group, an ethyl group, a propyl group and a butyl group, which are an alkyl group having a carbon number of 1 to 4, are preferred. The fumaric acid diester residue unit represented by formula (4) includes, for example, a dimethyl fumarate residue, a diethyl fumarate residue, a di-n-propyl fumarate residue, a diisopropyl fumarate residue, a di-n-butyl fumarate residue, a di-s-butyl fumarate residue, a di-tert-butyl fumarate residue, a di-n-pentyl fumarate residue, a di-s-butyl fumarate residue, a di-tert-pentyl fumarate residue, a di-n-pentyl fumarate residue, a di-s-pentyl fumarate residue, a di-tert-pentyl fumarate residue, a di-n-hexyl fumarate residue, a di-s-hexyl fumarate residue, a di-tert-hexyl fumarate residue, a di-2-ethylhexyl fumarate residue, a dicyclopropyl fumarate residue, a dicyclopentyl fumarate residue, and a dicyclohexyl fumarate residue. Among these, in view of good polymerizability, retardation developability and compatibility with the cellulose-based resin, a fumaric acid diester residue unit selected from a dimethyl fumarate residue unit, a diethyl fumarate residue unit, a diisopropyl fumarate residue unit and a di-tert-butyl fumarate residue unit is preferred.

In the present invention, assuming that the total of monomers including from 5 to 50 mol % of a fumaric acid monoester residue unit, from 0 to 80 mol % of a fumaric acid diester residue unit and from 10 to 90 mol % of an alkoxycinnamic acid ester residue unit is 100 mol %, the cinnamic acid ester copolymer may contain from 0 to 20 mol % of a residue unit of a monomer copolymerizable with cinnamic acid esters.

In the present invention, in the case where the cinnamic acid ester copolymer contains an alkoxycinnamic acid ester residue unit and contains a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8), it is preferable to contain from 5 to 85 mol % of a fumaric acid diester residue unit represented by formula (4), from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8), and from 10 to 90 mol % of an alkoxycinnamic acid ester residue unit represented by the following formula (2), and it is most preferable to contain from 5 to 65 mol % of a fumaric acid diester residue unit represented by formula (4), from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8), and from 30 to 90 mol % of an alkoxycinnamic acid ester residue unit represented by the following formula (2):

[Chem. 43]

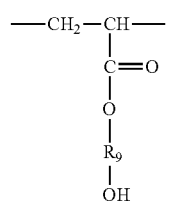

(5)

[Chem. 44]

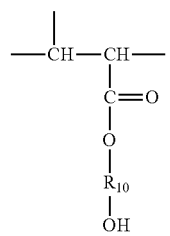

(6)

[Chem. 45]

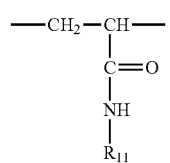

(7)

[Chem. 46]

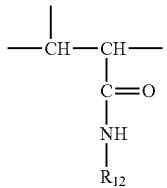
(8)

(wherein each of $R_9$, $R_{10}$, $R_{11}$ and $R_{12}$ independently represents an alkyl group having a carbon number of 1 to 12, an alkylene group or an ether group).

In the present invention, in the case where the cinnamic acid ester copolymer contains an alkoxycinnamic acid ester residue unit, when the content of a residue unit selected from the group consisting of an acrylic acid ester residue unit represented by formula (5), a methacrylic acid ester residue unit represented by formula (6), an acrylic acid amide residue unit represented by formula (7), and a methacrylic acid amide residue unit represented by formula (8) is more than 5 mol %, a resin having more excellent compatibility is obtained, and when the content of a residue unit selected from the group above is from 5 to 40 mol %, a resin having higher developability of retardation characteristics and more excellent compatibility is obtained. Furthermore, in the present invention, in the case where the cinnamic acid ester copolymer contains a residue unit selected from the group above, when the content of the fumaric acid diester residue unit represented by formula (4) is more than 5%, a resin having more excellent polymerizability is obtained.

In the present invention, in the case where the cinnamic acid ester copolymer contains a residue unit selected from the group consisting of an acrylic acid ester residue unit represented by formula (5), a methacrylic acid ester residue unit represented by formula (6), an acrylic acid amide residue unit represented by formula (7), and a methacrylic acid amide residue unit represented by formula (8), each of $R_9$, $R_{10}$, $R_{11}$ and $R_{12}$ which are part of the ester substituent of the acrylic acid ester residue unit, methacrylic acid ester residue unit, acrylic acid amide residue unit or methacrylic acid amide residue unit is an alkyl group having carbon number of 1 to 12, an alkylene group or an ether group, and examples thereof include a methyl (methylene) group, an ethyl (ethylene) group, a propyl (propylene) group, an isopropyl (isopropylene) group, an s-butyl (s-butylene) group, a tert-butyl (tert-butylene) group, an s-pentyl (s-pentylene) group, a tert-pentyl (tert-pentylene) group, an s-hexyl (s-hexylene) group, a tert-hexyl (tert-hexylene) group, a 2-ethylhexyl (2-ethylhexylene) group, a cyclopropyl (cyclopropylene) group, a cyclopentyl (cyclopentylene) group, a cyclohexyl (cyclohexylene) group, a methoxymethyl group, an ethoxymethyl group, a propoxymethyl group, an isopropoxymethyl group, an n-butoxymethyl group, an s-butoxymethyl group, a tert-butoxymethyl group, a methoxyethyl group, an ethoxyethyl group, a propoxyethyl group, an isopropoxyethyl group, an n-butoxyethyl group, an s-butoxyethyl group, and a tert-butoxyethyl group.

Assuming that the total of monomers including from 5 to 85 mol % of a fumaric acid diester residue unit, from 5 to 40 mol % of a residue unit selected from the group consisting of an acrylic acid ester residue unit represented by formula (5), a methacrylic acid ester residue unit represented by formula (6), an acrylic acid amide residue unit represented by formula (7), and a methacrylic acid amide residue unit represented by formula (8), and from 10 to 90 mol % of an alkoxycinnamic acid ester residue unit is 100 mol %, the cinnamic acid ester copolymer may contain from 0 to 20 mol % of a residue unit of a monomer copolymerizable with cinnamic acid esters.

In the present invention, in the case where the cinnamic acid ester copolymer contains a cinnamic acid ester residue unit with the benzene ring having an electron-withdrawing substituent, it is more preferable to contain 20 mol % or more of a fumaric acid diester residue unit represented by formula (4) and 5 mol % or more of a substituted cinnamic acid ester residue unit represented by formula (9), such as p-position-substituted cinnamic acid ester residue unit represented by the following formula (10):

[Chem. 47]

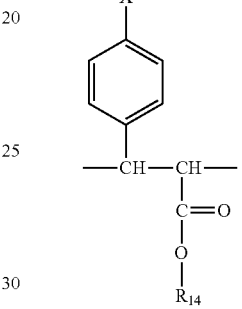
(10)

(wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group).

In the present invention, in the case where the cinnamic acid ester copolymer contains a p-position-substituted cinnamic acid ester residue unit represented by formula (10), when the content of the fumaric acid diester residue unit is 20 mol % or more, the polymerizability is more enhanced, and when the content of the p-position-substituted cinnamic acid ester residue unit is 5 mol % or more, the retardation developability is more enhanced. More specifically, in the present invention, the fumaric acid ester copolymer is a fumaric acid ester copolymer containing 20 mol % or more of a fumaric acid diester residue unit and 5 mol % or more of the p-position-substituted cinnamic acid ester residue unit, whereby the polymerizability of the copolymer is increased and when the resin composition according to the present invention is used as an optical compensation film, Re is more enhanced.

$R_{14}$ that is an ester substituent of the p-position-substituted cinnamic acid ester residue unit represented by formula (10) is an alkyl group having a carbon number of 1 to 12, and examples thereof include a methyl group, an ethyl group, a propyl group, an isopropyl group, an s-butyl group, a tert-butyl group, an s-pentyl group, a tert-pentyl group, an s-hexyl group, a tert-hexyl group, a 2-ethylhexyl group, a cyclopropyl group, a cyclopentyl group, and a cyclohexyl group. Among these, in view of compatibility with the cellulose resin, a methyl group, an ethyl group, a propyl group and a butyl group, which are an ester group having a carbon number of 1 to 4, are preferred. The substituent X is a substituent contributing to enhancement of negative retardation and is a nitro group, a bromo group, an iodo group, a cyano group, a chloro group, a sulfonic acid group, a carboxylic acid group, a fluoro group or a phenyl group. The p-position-substituted cinnamic acid ester residue unit represented by formula (10) includes, for example, a p-position-substituted cinnamic acid ester residue unit selected from a methyl 4-nitrocinnamate residue unit, an ethyl 4-nitrocinnamate residue unit, an isopropyl 4-nitrocinnamate residue unit, an n-propyl 4-nitrocinnamate residue unit, an n-butyl 4-nitrocinnamate residue unit, a sec-butyl 4-nitrocinnamate residue unit, a tert-butyl 4-nitrocinnamate residue unit, a 2-ethylhexyl 4-nitrocinnamate residue unit, a methyl 4-fluorocinnamate residue unit, an ethyl 4-fluorocinnamate residue unit, an isopropyl 4-fluorocinnamate residue unit, an n-propyl 4-fluorocinnamate residue unit, an n-butyl 4-fluorocinnamate residue unit, a sec-butyl 4-fluorocinnamate residue unit, a tert-butyl 4-fluorocinnamate residue unit, a 2-ethylhexyl 4-fluorocinnamate residue unit, a methyl 4-chlorocinnamate residue unit, an ethyl 4-chlorocinnamate residue unit, an isopropyl 4-chlorocinnamate residue unit, an n-propyl 4-chlorocinnamate residue unit, an n-butyl 4-chlorocinnamate residue unit, a sec-butyl 4-chlorocinnamate residue unit, a tert-butyl 4-chlorocinnamate residue unit, a 2-ethylhexyl 4-chlorocinnamate residue unit, a methyl 4-bromocinnamate residue unit, an ethyl 4-bromocinnamate residue unit, an isopropyl 4-bromocinnamate residue unit, an n-propyl 4-bromocinnamate residue unit, an n-butyl 4-bromocinnamate residue unit, a sec-butyl 4-bromocinnamate residue unit, a tert-butyl 4-bromocinnamate residue unit, a 2-ethylhexyl 4-bromocinnamate residue unit, a methyl 4-iodocinnamate residue unit, an ethyl 4-iodocinnamate residue unit, an isopropyl 4-iodocinnamate residue unit, an n-propyl 4-iodocinnamate residue unit, an n-butyl 4-iodocinnamate residue unit, a sec-butyl 4-iodocinnamate residue unit, a tert-butyl 4-iodocinnamate residue unit, a 2-ethylhexyl 4-iodocinnamate residue unit, a methyl 4-cyanocinnamate residue unit, an ethyl 4-cyanocinnamate residue unit, an isopropyl 4-cyanocinnamate residue unit, an n-propyl 4-cyanocinnamate residue unit, an n-butyl 4-cyanocinnamate residue unit, a sec-butyl 4-cyanocinnamate residue unit, a tert-butyl 4-cyanocinnamate residue unit, a 2-ethylhexyl 4-cyanocinnamate residue unit, a methyl 4-sulfonate cinnamate residue unit, an ethyl 4-sulfonate cinnamate residue unit, an isopropyl 4-sulfonate cinnamate residue unit, an n-propyl 4-sulfonate cinnamate residue unit, an n-butyl 4-sulfonate cinnamate residue unit, a sec-butyl 4-sulfonate cinnamate residue unit, a tert-butyl 4-sulfonate cinnamate residue unit, a 2-ethylhexyl 4-sulfonate cinnamate residue unit, an ethyl 4-carboxylate cinnamate residue unit, an isopropyl 4-carboxylate cinnamate residue unit, an n-propyl 4-carboxylate cinnamate residue unit, an n-butyl 4-carboxylate cinnamate residue unit, a sec-butyl 4-carboxylate cinnamate residue unit, a tert-butyl 4-carboxylate cinnamate residue unit, a 2-ethylhexyl 4-carboxylate cinnamate residue unit, a methyl 4-phenylcinnamate residue unit, an ethyl 4-phenylcinnamate residue unit, an isopropyl 4-phenylcinnamate residue unit, an n-propyl 4-phenylcinnamate residue unit, an n-butyl 4-phenylcinnamate residue unit, a sec-butyl 4-phenylcinnamate residue unit, a tert-butyl 4-phenylcinnamate residue unit, or a 2-ethylhexyl 4-phenylcinnamate residue unit.

In the present invention, when the cinnamic acid ester copolymer contains a p-position-substituted cinnamic acid ester residue unit represented by formula (10), the cinnamic acid ester copolymer exhibits more excellent polymerizability and compatibility and is therefore preferably, among others, a cinnamic acid ester copolymer containing from 20 to 90 mol % of a fumaric acid diester residue unit, from 5 to 75 mol % of a p-position-substituted cinnamic acid ester residue unit represented by formula (10), and from 5 to 30 mol % of a fumaric acid monoester residue unit represented by formula (3).

In the present invention, when the cinnamic acid ester copolymer contains a p-position-substituted cinnamic acid ester residue unit represented by formula (10) and the fumaric acid diester residue unit is a diethyl fumarate residue unit, the cinnamic acid ester copolymer exhibits more excellent compatibility and is therefore most preferably a cinnamic acid ester copolymer containing from 20 to 90 mol % of a diethyl fumarate residue unit, from 5 to 75 mol % of a p-position-substituted cinnamic acid ester residue unit represented by formula (10), and from 5 to 30 mol % of a fumaric acid monoester residue unit represented by formula (3).

In the present invention, when the cinnamic acid ester copolymer contains a p-position-substituted cinnamic acid ester residue unit represented by formula (10) and contains a residue unit selected from the group consisting of an acrylic acid ester residue unit represented by formula (5), a methacrylic acid ester residue unit represented by formula (6), an acrylic acid amide residue unit represented by formula (7), and a methacrylic acid amide residue unit represented by formula (8), in view of retardation characteristics and compatibility, the cinnamic acid ester copolymer is most preferably a cinnamic acid ester copolymer containing from 20 to 94.5 mol % of a fumaric acid diester residue unit represented by formula (4), from 5 to 75 mol % of a p-position-substituted cinnamic acid ester residue unit represented by formula (10), and from 0.5 to 30 mol % of a residue unit selected from the group consisting of an acrylic acid ester residue unit represented by formula (5), a methacrylic acid ester residue unit represented by formula (6), an acrylic acid amide residue unit represented by formula (7), and a methacrylic acid amide residue unit represented by formula (8).

In the present invention, assuming that the total of monomers including a fumaric acid diester residue unit and a p-position-substituted cinnamic acid ester residue unit represented by formula (10) is 100 mol %, the cinnamic acid ester copolymer may contain from 0 to 20 mol % of a residue unit of a monomer copolymerizable with cinnamic acid esters.

The residue unit of a monomer copolymerizable with cinnamic acid esters includes, for example, one member or two or more members of a residue of styrenes, such as styrene residue and α-methylstyrene residue; an acrylic acid residue; a residue of acrylic acid esters, such as methyl acrylate residue, ethyl acrylate residue and butyl acrylate residue; a methacrylic acid residue; a residue of methacrylic acid esters, such as methyl methacrylate residue, ethyl methacrylate residue and butyl methacrylate residue; a residue of vinyl esters, such as vinyl acetate residue and vinyl propionate residue; a vinyl ether residue such as methyl vinyl ether residue, ethyl vinyl ether residue and butyl vinyl ether residue; an N-substituted maleimide residue such as N-methylmaleimide residue, N-cyclohexylmaleimide residue and N-phenylmaleimide residue; an acrylonitrile residue; a methacrylonitrile residue; a cinnamic acid ester residue such as methyl cinnamate residue, ethyl cinnamate residue, isopropyl cinnamate residue, n-propyl cinnamate residue, n-butyl cinnamate residue, s-butyl cinnamate residue and tert-butyl cinnamate residue; a cinnamic acid residue; a residue of olefins, such as ethylene residue and propylene residue; a vinylpyrrolidone residue; and a vinylpyridine residue.

In the cinnamic acid ester copolymer, for the reason that the mechanical properties are excellent and the formability at the time of film production is excellent, the number average molecular weight (Mn) as determined in terms of standard polystyrene from an elution curve measured by gel permeation chromatography (GPC) is preferably from $1 \times 10^3$ to $5 \times 10^6$, more preferably from $5 \times 10^3$ to $2 \times 10^5$.

The compositional proportions of the cellulose-based resin and the cinnamic acid ester copolymer in the resin composition of the present invention are from 30 to 99 wt % of the cellulose-based resin and from 1 to 70 wt % of the cinnamic acid ester copolymer. If the cellulose-based resin is less than 30 wt % (if the cinnamic acid ester copolymer exceeds 70 wt %) or the cellulose-based resin exceeds 99 wt % (if the cinnamic acid ester copolymer is less than 1 wt %), control of the retardation is difficult. The compositional proportions are preferably from 30 to 90 wt % of the cellulose-based resin and from 10 to 70 wt % of the cinnamic acid ester copolymer, more preferably from 40 to 80 wt % of the cellulose-based resin and from 20 to 60 wt % of the cinnamic acid ester copolymer.

As for the production method of the cinnamic acid ester copolymer, the copolymer may be produced by any method as long as the cinnamic acid ester copolymer is obtained.

In the present invention, in the case where the cinnamic acid ester copolymer contains a fumaric acid diester residue unit, a fumaric acid monoester residue unit and an alkoxycinnamic acid ester residue unit, as the production method of the cinnamic acid ester copolymer, for example, radical polymerization is performed using fumaric acid monoesters, fumaric acid diesters and alkoxycinnamic acid esters and depending on the case, using a monomer copolymerizable with the fumaric acid monoesters, fumaric acid diesters and alkoxycinnamic acid esters in combination, whereby the cinnamic acid ester copolymer can be produced. At this time, the fumaric acid monoesters include, for example, monomethyl fumarate, monoethyl fumarate, mono-n-propyl fumarate, monoisopropyl fumarate, mono-n-butyl fumarate, mono-s-butyl fumarate, mono-tert-butyl fumarate, mono-s-pentyl fumarate, mono-tert-pentyl fumarate, mono-s-hexyl fumarate, mono-tert-hexyl fumarate, mono-2-ethylhexyl fumarate, monocyclopropyl fumarate, monocyclopentyl fumarate, and monocyclohexyl fumarate. The fumaric acid diesters include, for example, dimethyl fumarate, diethyl fumarate, di-n-propyl fumarate, diisopropyl fumarate, di-n-butyl fumarate, di-s-butyl fumarate, di-tert-butyl fumarate, di-s-pentyl fumarate, di-tert-pentyl fumarate, di-s-hexyl fumarate, di-tert-hexyl fumarate, di-2-ethylhexyl fumarate, dicyclopropyl fumarate, dicyclopentyl fumarate, and dicyclohexyl fumarate. The alkoxycinnamic acid esters include, for example, methyl 4-methoxycinnamate, ethyl 4-methoxycinnamate, isopropyl 4-methoxycinnamate, n-propyl 4-methoxycinnamate, n-butyl 4-methoxycinnamate, sec-butyl 4-methoxycinnamate, tert-butyl 4-methoxycinnamate, 2-ethylhexyl 4-methoxycinnamate, methyl 4-ethoxycinnamate, ethyl 4-ethoxycinnamate, isopropyl 4-ethoxycinnamate, n-propyl 4-ethoxycinnamate, n-butyl 4-ethoxycinnamate, sec-butyl 4-ethoxycinnamate, tert-butyl 4-ethoxycinnamate, 2-ethylhexyl 4-ethoxycinnamate, methyl 4-isopropoxycinnamate, ethyl 4-isopropoxycinnamate, isopropyl 4-isopropoxycinnamate, n-propyl 4-isopropoxycinnamate, n-butyl 4-isopropoxycinnamate, sec-butyl 4-isopropoxycinnamate, tert-butyl 4-isopropoxycinnamate, 2-ethylhexyl 4-isopropoxycinnamate, methyl 4-n-propoxycinnamate, ethyl 4-n-propoxycinnamate, isopropyl 4-n-propoxycinnamate, n-propyl 4-n-propoxycinnamate, n-butyl 4-n-propoxycinnamate, sec-butyl 4-n-propoxycinnamate, tert-butyl 4-n-propoxycinnamate, 2-ethylhexyl 4-n-propoxycinnamate, methyl 4-n-butoxycinnamate, ethyl 4-n-butoxycinnamate, isopropyl 4-n-butoxycinnamate, n-propyl 4-n-butoxycinnamate, n-butyl 4-n-butoxycinnamate, sec-butyl 4-n-butoxycinnamate, tert-butyl 4-n-butoxycinnamate, 2-ethylhexyl 4-n-butoxycinnamate, methyl 4-sec-butoxycinnamate, ethyl 4-sec-butoxycinnamate, isopropyl 4-sec-butoxycinnamate, n-propyl 4-sec-butoxycinnamate, n-butyl 4-sec-butoxycinnamate, sec-butyl 4-sec-butoxycinnamate, tert-butyl 4-sec-butoxycinnamate, 2-ethylhexyl 4-sec-butoxycinnamate, methyl 4-tert-butoxycinnamate, ethyl 4-tert-butoxycinnamate, isopropyl 4-tert-butoxycinnamate, n-propyl 4-tert-butoxycinnamate, n-butyl 4-tert-butoxycinnamate, sec-butyl 4-tert-butoxycinnamate, tert-butyl 4-tert-butoxycinnamate, 2-ethylhexyl 4-tert-butoxycinnamate, methyl 3-methoxycinnamate, ethyl 3-methoxycinnamate, isopropyl 3-methoxycinnamate, n-propyl 3-methoxycinnamate, n-butyl 3-methoxycinnamate, sec-butyl 3-methoxycinnamate, tert-butyl 3-methoxycinnamate, 2-ethylhexyl 3-methoxycinnamate, methyl 3-ethoxycinnamate, ethyl 3-ethoxycinnamate, isopropyl 3-ethoxycinnamate, n-propyl 3-ethoxycinnamate, n-butyl 3-ethoxycinnamate, sec-butyl 3-ethoxycinnamate, tert-butyl 3-ethoxycinnamate, 2-ethylhexyl 3-ethoxycinnamate, methyl 3-isopropoxycinnamate, ethyl 3-isopropoxycinnamate, isopropyl 3-isopropoxycinnamate, n-propyl 3-isopropoxycinnamate, n-butyl 3-isopropoxycinnamate, sec-butyl 3-isopropoxycinnamate, tert-butyl 3-isopropoxycinnamate, 2-ethylhexyl 3-isopropoxycinnamate, methyl 3-n-propoxycinnamate, ethyl 3-n-propoxycinnamate, isopropyl 3-n-propoxycinnamate, n-propyl 3-n-propoxycinnamate, n-butyl 3-n-propoxycinnamate, sec-butyl 3-n-propoxycinnamate, tert-butyl 3-n-propoxycinnamate, 2-ethylhexyl 3-n-propoxycinnamate, methyl 3-n-butoxycinnamate, ethyl 3-n-butoxycinnamate, isopropyl 3-n-butoxycinnamate, n-propyl 3-n-butoxycinnamate, n-butyl 3-n-butoxycinnamate, sec-butyl 3-n-butoxycinnamate, tert-butyl 3-n-butoxycinnamate, 2-ethylhexyl 3-n-butoxycinnamate, methyl 3-sec-butoxycinnamate, ethyl 3-sec-butoxycinnamate, isopropyl 3-sec-butoxycinnamate, n-propyl 3-sec-butoxycinnamate, n-butyl 3-sec-butoxycinnamate, sec-butyl 3-sec-butoxycinnamate, tert-butyl 3-sec-butoxycinnamate, 3-ethylhexyl 3-sec-butoxycinnamate, methyl 3-tert-butoxycinnamate, ethyl 3-tert-butoxycinnamate, isopropyl 3-tert-butoxycinnamate, n-propyl 3-tert-butoxycinnamate, n-butyl 3-tert-butoxycinnamate, sec-butyl 3-tert-butoxycinnamate, tert-butyl 3-tert-butoxycinnamate, 2-ethylhexyl 3-tert-butoxycinnamate, methyl 2-methoxycinnamate, ethyl 2-methoxycinnamate, isopropyl 2-methoxycinnamate, n-propyl 2-methoxycinnamate, n-butyl 2-methoxycinnamate, sec-butyl 2-methoxycinnamate, tert-butyl 2-methoxycinnamate, 2-ethylhexyl 2-methoxycinnamate, methyl 2-ethoxycinnamate, ethyl 2-ethoxycinnamate, isopropyl 2-ethoxycinnamate, n-propyl 2-ethoxycinnamate, n-butyl 2-ethoxycinnamate, sec-butyl 2-ethoxycinnamate, tert-butyl 2-ethoxycinnamate, 2-ethylhexyl 2-ethoxycinnamate, methyl 2-isopropoxycinnamate, ethyl 2-isopropoxycinnamate, isopropyl 2-isopropoxycinnamate, n-propyl 2-isopropoxycinnamate, n-butyl 2-isopropoxycinnamate, sec-butyl 2-isopropoxycinnamate, tert-butyl 2-isopropoxycinnamate, 2-ethylhexyl 2-isopropoxycinnamate, methyl 2-n-propoxycinnamate, ethyl 2-n-propoxycinnamate, isopropyl 2-n-propoxycinnamate, n-propyl 2-n-propoxycinnamate, n-butyl 2-n-propoxycinnamate, sec-butyl 2-n-propoxycinnamate, tert-butyl 2-n-propoxycinnamate, 2-ethylhexyl 2-n-propoxycinnamate, methyl 2-n-butoxycinnamate, ethyl 2-n-butoxycinnamate, isopropyl 2-n-butoxycinnamate, n-propyl 2-n-butoxycinnamate, n-butyl 2-n-butoxycinnamate, sec-butyl 2-n-butoxycinnamate, tert-butyl 2-n-butoxycinnamate, 2-ethylhexyl 2-n-butoxycinnamate, methyl 2-sec-butoxycinnamate, ethyl 2-sec-butoxycinnamate, isopropyl 2-sec-butoxycinnamate, n-propyl 2-sec-butoxycinnamate, n-butyl 2-sec-butoxycinnamate, sec-butyl 2-sec-butoxycinnamate, tert-butyl 2-sec-butoxycinnamate, 2-ethylhexyl 2-sec-butoxycinnamate, methyl 2-tert-butoxycinnamate, ethyl 2-tert-butoxycinnamate, isopropyl 2-tert-butoxycinnamate, n-propyl 2-tert-butoxycinnamate, n-butyl 2-tert-butoxycinnamate, sec-butyl 2-tert-butoxycinnamate, tert-butyl 2-tert-butoxycinnamate, and 2-ethylhexyl 2-tert-butoxycinnamate. The monomer copolymerizable with fumaric acid monoesters, fumaric acid diesters and alkoxycinnamic acid esters includes, for example, one member or two or more members of styrenes such as styrene and α-methylstyrene; acrylic acid; acrylic acid esters such as methyl acrylate, ethyl acrylate and butyl acrylate; methacrylic acid; methacrylic acid esters such as methyl methacrylate, ethyl methacrylate and butyl methacrylate; vinyl esters such as vinyl acetate and vinyl propionate; a vinyl ether such as methyl vinyl ether, ethyl vinyl ether and butyl vinyl ether; an N-substituted maleimide such as N-methylmaleimide, N-cyclohexylmaleimide and N-phenylmaleimide; acrylonitrile; methacrylonitrile; a cinnamic acid ester such as methyl cinnamate, ethyl cinnamate, isopropyl cinnamate, n-propyl cinnamate, n-butyl cinnamate, s-butyl cinnamate and tert-butyl cinnamate; cinnamic acid; olefins such as ethylene and propylene; vinylpyrrolidone; and vinylpyridine.

In the present invention, in the case where the cinnamic acid ester copolymer contains a fumaric acid diester residue unit and a p-position-substituted cinnamic acid ester residue unit represented by formula (10), as the production method of the cinnamic acid ester copolymer, for example, radical polymerization is performed using fumaric acid diesters and p-position-substituted cinnamic acid esters represented by formula (10) and depending on the case, using a monomer copolymerizable with the fumaric acid diesters and the p-position-substituted cinnamic acid esters in combination, whereby the cinnamic acid ester copolymer can be produced. The p-position-substituted cinnamic acid esters include, for example, methyl 4-nitrocinnamate, ethyl 4-nitrocinnamate, isopropyl 4-nitrocinnamate, n-propyl 4-nitrocinnamate, n-butyl 4-nitrocinnamate, sec-butyl 4-nitrocinnamate, tert-butyl 4-nitrocinnamate, 2-ethylhexyl 4-nitrocinnamate, methyl 4-fluorocinnamate, ethyl 4-fluorocinnamate, isopropyl 4-fluorocinnamate, n-propyl 4-fluorocinnamate, n-butyl 4-fluorocinnamate, sec-butyl 4-fluorocinnamate, tert-butyl 4-fluorocinnamate, 2-ethylhexyl 4-fluorocinnamate, methyl 4-chlorocinnamate, ethyl 4-chlorocinnamate, isopropyl 4-chlorocinnamate, n-propyl 4-chlorocinnamate, n-butyl 4-chlorocinnamate, sec-butyl 4-chlorocinnamate, tert-butyl 4-chlorocinnamate, 2-ethylhexyl 4-chlorocinnamate, methyl 4-bromocinnamate, ethyl 4-bromocinnamate, isopropyl 4-bromocinnamate, n-propyl 4-bromocinnamate, n-butyl 4-bromocinnamate, sec-butyl 4-bromocinnamate, tert-butyl 4-bromocinnamate, 2-ethylhexyl 4-bromocinnamate, methyl 4-iodocinnamate, ethyl 4-iodocinnamate, isopropyl 4-iodocinnamate, n-propyl 4-iodocinnamate, n-butyl 4-iodocinnamate, sec-butyl 4-iodocinnamate, tert-butyl 4-iodocinnamate, 2-ethylhexyl 4-iodocinnamate, methyl 4-cyanocinnamate, ethyl 4-cyanocinnamate, isopropyl 4-cyanocinnamate, n-propyl 4-cyanocinnamate, n-butyl 4-cyanocinnamate, sec-butyl 4-cyanocinnamate, tert-butyl 4-cyanocinnamate, 2-ethylhexyl 4-cyanocinnamate, methyl 4-sulfonate cinnamate, ethyl 4-sulfonate cinnamate, isopropyl 4-sulfonate cinnamate, n-propyl 4-sulfonate cinnamate, n-butyl 4-sulfonate cinnamate, sec-butyl 4-sulfonate cinnamate, tert-butyl 4-sulfonate cinnamate, 2-ethylhexyl 4-sulfonate cinnamate, ethyl 4-carboxylate cinnamate, isopropyl 4-carboxylate cinnamate, n-propyl 4-carboxylate cinnamate, n-butyl 4-carboxylate cinnamate, sec-butyl 4-carboxylate cinnamate, tert-butyl 4-carboxylate cinnamate, 2-ethylhexyl 4-carboxylate cinnamate, methyl 4-phenylcinnamate, ethyl 4-phenylcinnamate, isopropyl 4-phenylcinnamate, n-propyl 4-phenylcinnamate, n-butyl 4-phenylcinnamate, sec-butyl 4-phenylcinnamate, tert-butyl 4-phenylcinnamate, and 2-ethylhexyl 4-phenylcinnamate. In the case where fumaric acid monoesters are used as the copolymerizable monomer, the fumaric acid monoesters include, for example, monomethyl fumarate, monoethyl fumarate, mono-n-propyl fumarate, monoisopropyl fumarate, mono-n-butyl fumarate, mono-s-butyl fumarate, mono-tert-butyl fumarate, mono-n-pentyl fumarate, mono-s-pentyl fumarate, mono-tert-pentyl fumarate, mono-n-hexyl fumarate, mono-s-hexyl fumarate, mono-tert-hexyl fumarate, mono-2-ethylhexyl fumarate, monocyclopropyl fumarate, monocyclopentyl fumarate, and monocyclohexyl fumarate. In the present invention, other copolymerizable monomers used in the radical polymerization include, for example, one member or two or more members of styrenes such as styrene and α-methylstyrene; acrylic acid; acrylic acid esters such as methyl acrylate, ethyl acrylate and butyl acrylate; methacrylic acid; methacrylic acid esters such as methyl methacrylate, ethyl methacrylate and butyl methacrylate; vinyl esters such as vinyl acetate and vinyl propionate; acrylonitrile; methacrylonitrile; a cinnamic acid ester such as methyl cinnamate, ethyl cinnamate and propyl cinnamate; cinnamic acid; olefins such as ethylene and propylene; vinylpyrrolidone; and vinylpyridine.

As the method for radical polymerization, for example, any of a bulk polymerization method, a solution polymerization method, a suspension polymerization method, a precipitation polymerization method, and an emulsion polymerization method may be employed.

The polymerization initiator at the time of performing radical polymerization includes, for example, an organic peroxide such as benzoyl peroxide, lauryl peroxide, octanoyl peroxide, acetyl peroxide, di-tert-butyl peroxide, tert-butyl cumyl peroxide, dicumyl peroxide and 2,5-dimethyl-2,5-di (2-ethylhexanoylperoxy)hexane; and an azo-based initiator such as 2,2'-azobis(2,4-dimethylvaleronitrile), 2,2'-azobis (2-butyronitrile), 2,2'-azobisisobutyronitrile, dimethyl 2,2'-azobisisobutyrate and 1,1'-azobis(cyclohexane-1-carbonitrile).

The solvent usable in the solution polymerization method or precipitation polymerization method is not particularly limited and includes, for example, an aromatic solvent such as benzene, toluene and xylene; an alcohol-based solvent such as methanol, ethanol, propyl alcohol and butyl alcohol; cyclohexane; dioxane; tetrahydrofuran; acetone; methyl ethyl ketone; dimethyl formamide; isopropyl acetate; and a mixed solvent thereof.

The polymerization temperature at the time of performing radical polymerization can be appropriately set according to the decomposition temperature of the polymerization initiator, and in general, the polymerization is preferably performed at 30 to 150° C.

The resin composition of the present invention may contain an antioxidant so as to enhance the thermal stability. The antioxidant includes, for example, a hindered phenol-based antioxidant, a phosphorus-based antioxidant, a sulfur-based antioxidant, a lactone-based antioxidant, an amine-based antioxidant, a hydroxylamine-based antioxidant, a vitamin E-based antioxidant, and other antioxidants. One of these antioxidants may be used alone, or two or more thereof may be used in combination.

The resin composition of the present invention may contain a hindered amine-based light stabilizer or an ultraviolet absorber so as to enhance the weather resistance. The ultraviolet absorber includes, for example, benzotriazole, benzophenone, triazine, and benzoate.

In the resin composition of the present invention, a compound known as a so-called plasticizer may be added for the purpose of, for example, improving the mechanical property, imparting flexibility, imparting water absorption resistance, reducing the water vapor permeability, and adjusting the retardation, and the plasticizer includes, for example, a phosphoric acid ester and a carboxylic acid ester. In addition, an acrylic polymer, etc. are also used. The phosphoric acid ester includes, for example, triphenyl phosphate, tricresyl phosphate, and phenyldiphenyl phosphate. The carboxylic acid ester includes a phthalic acid ester, a citric acid ester, etc. The phthalic acid ester includes, for example, dimethyl phthalate, diethyl phthalate, dicyclohexyl phthalate, dioctyl phthalate, and diethylhexyl phthalate, and the citric acid ester includes acetyl triethyl citrate, acetyl tributyl citrate, etc. Other examples include butyl oleate, methyl acetyl ricinoleate, dibutyl sebacate, triacetin, and trimethylolpropane tribenzoate. An alkylphthalylalkyl glycolate is also used for this purpose. The alkyl of the alkylphthalylalkyl glycolate is an alkyl group having 1 to 8 carbon atoms. The alkylphthalylalkyl glycolate includes methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate, etc. Two or more of these plasticizers may be mixed and used.

The resin composition of the present invention may contain an additive having an aromatic hydrocarbon ring or an aromatic heterocyclic ring for the purpose of adjusting the retardation. The birefringence Δn represented by the following formula (A) of the additive used for the purpose of adjusting the retardation is not particularly limited, but from the viewpoint that an optical compensation film having excellent optical properties is obtained, the birefringence is preferably 0.05 or more, more preferably from 0.05 to 0.5, still more preferably from 0.1 to 0.5. The Δn of the additive can be determined by a molecular orbital calculation.

$$\Delta n = n_y - n_x \quad (A)$$

(wherein nx represents the refractive index in the fast axis direction of the additive molecule, and ny represents the refractive index in the slow axis direction of the additive molecule).

In the case of incorporating an additive having an aromatic hydrocarbon ring or an aromatic heterocyclic ring into the resin composition of the present invention, the additive having an aromatic hydrocarbon ring or an aromatic heterocyclic ring in the resin composition of the present invention is not particularly limited as to the number of aromatic hydrocarbon rings or aromatic heterocyclic rings in the molecule, but from the viewpoint that an optical compensation film having excellent optical properties is obtained, the number of such rings is preferably from 1 to 12, more preferably from 1 to 8. The aromatic hydrocarbon ring includes, for example, a 5-membered ring, a 6-membered ring, a 7-membered ring, and a fused ring composed of two or more aromatic rings, and the aromatic heterocyclic ring includes, for example, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring.

The aromatic hydrocarbon ring or aromatic heterocyclic ring may have a substituent, and the substituent includes, for example, a hydroxyl group, an ether group, a carbonyl group, an ester group, a carboxylic acid residue, an amino group, an imino group, an amido group, an imido group, a cyano group, a nitro group, a sulfonyl group, a sulfonic acid residue, a phosphonyl group, and a phosphonic acid residue.

The additive having an aromatic hydrocarbon ring or an aromatic heterocyclic ring for use in the present invention includes, for example, a phosphoric acid ester-based compound such as tricresyl phosphate, trixylenyl phosphate, triphenyl phosphate, 2-ethylhexyldiphenyl phosphate, cresyldiphenyl phosphate and bisphenol A bis(diphenyl phosphate); a phthalic acid ester-based compound such as dimethyl phthalate, diethyl phthalate, dibutyl phthalate, dihexyl phthalate, di-normal-octyl phthalate, 2-ethylhexyl phthalate, diisooctyl phthalate, dicapryl phthalate, dinonyl phthalate, diisononyl phthalate, didecyl phthalate and diisodecyl phthalate; a trimellitic acid ester-based compound such as tributyl trimellitate, tri-normal-hexyl trimellitate, tri(2-ethylhexyl)trimellitate, tri-normal-octyl trimellitate, tri-isooctyl trimellitate and tri-isodecyl trimellitate; a pyromellitic acid ester-based compound such as tri(2-ethylhexyl)pyromellitate, tetrabutyl pyromellitate, tetra-normal-hexyl pyromellitate, tetra(2-ethylhexyl)pyromellitate, tetra-normal-octyl pyromellitate, tetra-isooctyl pyromellitate and tetra-isodecyl pyromellitate; a benzoic acid ester-based compound such as ethyl benzoate, isopropyl benzoate and ethyl paraoxybenzoate; a salicylic acid ester-based compound such as phenyl salicylate, p-octylphenyl salicylate and p-tert-butylphenyl salicylate; a glycolic acid ester-based compound such as methylphthalylethyl glycolate, ethylphthalylethyl glycolate and butylphthalylbutyl glycolate; a benzotriazole-based compound such as 2-(2'-hydroxy-5'-tert-butylphenyl)benzotriazole and 2-(2'-hydroxy-3',5'-di-tert-butylphenyl)benzotriazole; a benzophenone-based compound such as 2-hydroxy-4-methoxybenzophenone, 2,2'-dihydroxy-4-methoxybenzophenone, 2,4-dihydroxybenzophenone, 2,2',4,4'-tetrahydroxybenzophenone and 2-hydroxy-4-methoxy-5-sulfobenzophenone; a sulfonamide-based compound such as N-benzenesulfonamide; and a triazine-based compound such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine and 2,4-diphenyl-(2-hydroxy-4-butoxyphenyl)-1,3,5-triazine. In view of compatibility with the resin, tricresyl phosphate, 2-ethylhexyldiphenyl phosphate, 2-hydroxy-4-methoxybenzophenone, and 2,2',4,4'-tetrahydroxybenzophenone are preferred. One of these may be used, or two or more thereof may be used in combination, as needed.

In the case of incorporating an additive having an aromatic hydrocarbon ring or an aromatic heterocyclic ring into the resin composition of the present invention, in view of optical properties and mechanical properties, the proportion of the additive having an aromatic hydrocarbon ring or an aromatic heterocyclic ring in the resin composition of the present invention is preferably from 0.01 to 30 wt % (the resin component above: from 70 to 99.99 wt %), more preferably from 0.01 to 20 wt %, furthermore preferably from 0.01 to 15 wt %.

The resin composition of the present invention may contain other polymers, a surfactant, a polymer electrolyte, an electroconductive complex, a pigment, a dye, an antistatic agent, an antiblocking agent, a lubricant, etc., as long as the gist of the invention is observed.

The resin composition of the present invention can be obtained by blending a cellulose-based resin and a cinnamic acid ester copolymer.

As for the blending method, a melt blending method, a solution blending method, or other methods may be used. The melt blending method when incorporating an additive having an aromatic hydrocarbon ring or an aromatic heterocyclic ring into the resin composition of the present invention is a method where the resin and the additive having an aromatic hydrocarbon ring or an aromatic heterocyclic ring are melted by heating and kneaded, thereby producing the resin composition. The solution blending method is a method where the resin and the additive having an aromatic hydrocarbon ring or an aromatic heterocyclic ring are dissolved in a solvent and blended. The solvent which can be used for the solution blending includes, for example, a chlorine-based solvent such as methylene chloride and chloroform; an aromatic solvent such as toluene and xylene; acetone; methyl ethyl ketone; methyl isobutyl ketone; an alcohol solvent such as methanol, ethanol and propanol; an ether solvent such as dioxane and tetrahydrofuran; dimethylformamide; and N-methylpyrrolidone. It is also possible to dissolve each of the resin and the additive having an aromatic hydrocarbon ring or an aromatic heterocyclic ring in a solvent and thereafter, blend the solutions. Furthermore, it is possible to knead a powder, a pellet, etc. of each resin and then dissolve the kneaded product in a solvent. The obtained blend resin solution may be charged into a poor solvent to precipitate the resin composition, or the blend resin solution may be directly used for the production of an optical compensation film.

In view of handleability of the film and suitability for thinning of an optical member, the optical compensation film using the resin composition of the present invention preferably has a thickness of 5 to 200 μm, more preferably from 10 to 100 μm, still more preferably from 20 to 80 μm, and most preferably from 20 to 60 μm.

The retardation characteristics of the optical compensation film using the resin composition of the present invention vary depending on the intended optical compensation film and, for example, include: 1) the in-plane retardation (Re) represented by the following expression (1) is preferably from 80 to 300 nm, more preferably from 100 to 300 nm, still more preferably from 100 to 280 nm, and the Nz coefficient represented by the following expression (2) is preferably from 0.35 to 0.65, more preferably from 0.45 to 0.55; 2) the in-plane retardation (Re) is preferably from 50 to 200 nm, more preferably from 80 to 160 nm, and the Nz coefficient is preferably from −0.2 to 0.2, more preferably from −0.1 to 0.1; and 3) the in-plane retardation (Re) is preferably from 0 to 20 nm, more preferably from 0 to 5 nm, and the out-of-plane retardation (Rth) represented by the following expression (3) is preferably from −150 to 20 nm, more preferably from −150 to 10 nm, still more preferably from −120 to 0 nm. The retardation characteristics here are values as measured using a full-automatic birefringence analyzer (trade name: KOBRA-21ADH, manufactured by Oji Scientific Instruments) under the condition of a measurement wavelength of 589 nm.

These have retardation characteristics difficult to develop in an optical compensation film composed of a conventional cellulose-based resin.

$$Re = (ny - nx) \times d \quad (1)$$

$$Nz = (ny - nz)/(ny - nx) \quad (2)$$

$$Rth = [(nx + ny)/2 - nz] \times d \quad (3)$$

(wherein nx represents a refractive index in a fast axis direction in a film plane, ny represents a refractive index in a slow axis direction in a film plane, nz represents a refractive index outside a film plane, and d represents the film thickness).

In order to suppress a color shift, the wavelength dispersion characteristics of the optical film of the present invention are preferably $0.60 < Re(450)/Re(550) < 1.05$, more preferably $0.61 < Re(450)/Re(550) < 1.02$, still more preferably $0.61 < Re(450)/Re(550) < 1.00$.

In the case of using a cellulose ether as the cellulose-based resin of the present invention, the cellulose ether can by itself provide an optical film having low wavelength dispersion. A resin composition in which this film is blended with a cinnamic acid ester copolymer exhibiting negative birefringence in the stretching direction can generally provide an optical film exhibiting reverse wavelength dispersion property.

It is difficult for an optical compensation film using a conventional cellulose-based resin to simultaneously satisfy these retardation characteristics and wavelength dispersion characteristics, but in the case of using a cellulose ether in the present invention, the optical compensation film using the resin composition of the present invention satisfies these characteristics at the same time.

In the optical compensation film of the present invention, in order to reduce the required film thickness, the ratio Re(589) (nm)/film thickness (μm) between the retardation at 589 nm and the film thickness is preferably 4.0 nm/μm or more.

In the optical compensation film of the present invention, from the viewpoint of enhancing the luminance, the light transmittance is preferably 85% or more, more preferably 90% or more.

In the optical compensation film of the present invention, from the viewpoint of enhancing the contrast, the haze is preferably 1% or less, more preferably 0.5% or less.

As for the production method of the optical compensation film using the resin composition of the present invention, any method may be used as long as the optical compensation film of the present invention can be produced, but production by a solution casting method is preferred, because an optical compensation film excellent in the optical properties, heat resistance, surface characteristics, etc. is obtained. Here, the solution casting method is a method of casting a resin solution (generally called a dope) on a supporting substrate and evaporating the solvent by heating to obtain an optical compensation film. As the method for casting, for example, a T-die method, a doctor blade method, a bar coater method, a roll coater method, and a lip coater method are used, and in industry, a method of continuously extruding a dope from a die on a belt-shaped or drum-shaped supporting substrate is commonly employed. The supporting substrate used includes, for example, a glass substrate, a metal substrate such as stainless steel and ferrotype, and a plastic substrate such as polyethylene terephthalate. In order to industrially produce a substrate with highly excellent surface property and optical homogeneity by continuous film production, a metal substrate having a mirror-finished surface is preferably used. At the time of producing an optical compensation film excellent in the thickness precision and surface smoothness by a solution casting method, the viscosity of the resin solution is a very important factor, and the viscosity of the resin solution depends on the concentration or molecular weight of the resin or the type of the solvent.

The resin solution at the time of production of the optical compensation film using the resin composition of the present invention is prepared by dissolving the cellulose-based resin and the cinnamic acid ester copolymer in a solvent. The viscosity of the resin solution can be adjusted by the molecular weight of the polymer, the concentration of the polymer, or the type of the solvent. The viscosity of the resin solution is not particularly limited but in order to more facilitate the film coatability, the viscosity is preferably from 100 to 10,000 cps, more preferably from 300 to 5,000 cps, still more preferably from 500 to 3,000 cps.

The production method of the optical compensation film using the resin composition of the present invention includes, for example, a method of dissolving a resin composition containing, as the resin component, from 30 to 99 wt % of a cellulose-based resin represented by the following formula (1) and from 1 to 70 wt % of a cinnamic acid ester copolymer in a solvent, casting the obtained resin solution on a base material, and after drying, separating the film from the base material:

[Chem. 48]

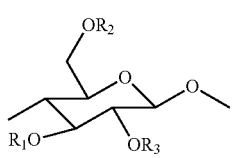

(1)

(wherein each of $R_1$, $R_2$ and $R_3$ independently represents hydrogen or a substituent having a carbon number of 1 to 12).

The optical compensation film obtained using the resin composition of the present invention is preferably subjected to uniaxial stretching or unbalanced biaxial stretching so as to develop the in-plane retardation (Re). As the method for stretching the optical compensation film, for example, a longitudinal uniaxial stretching method by roll stretching, a transverse uniaxial stretching method by tenter stretching, and a combination thereof, that is, an unbalanced sequential biaxial stretching method or an unbalanced simultaneous biaxial stretching method, may be used. Furthermore, in the present invention, the retardation characteristics can be developed without using a special stretching method of performing the stretching under the action of a shrinking force of a heat-shrinkable film.

In view of ease of stretching and suitability for thinning of an optical member, the thickness of the optical compensation film at the time of stretching is preferably from 10 to 200 μm, more preferably from 30 to 150 μm, still more preferably from 30 to 100 μm.

The stretching temperature is not particularly limited but is preferably from 50 to 200° C., more preferably from 100 to 180° C., because good retardation characteristics are obtained. The stretch ratio in uniaxial stretching is not particularly limited but is preferably from 1.05 to 4.0 times, more preferably from 1.1 to 3.5 times, because good retardation characteristics are obtained. The stretch ratio in unbalanced biaxial stretching is not particularly limited, but the stretch ratio in the length direction is preferably from 1.05 to 4.0 times, more preferably from 1.1 to 3.5 times, because an optical compensation film having excellent optical properties is obtained, and the stretch ratio in the width direction is preferably from 1.01 to 1.2 times, more preferably from 1.05 to 1.1 times, because an optical compensation film having excellent optical properties is obtained. The in-plane retardation (Re) can be controlled by the stretching temperature and the stretch ratio.

The optical compensation film using the resin composition of the present invention can be laminated, as needed, to a film containing other resins. Other resins include, for example, polyethersulfone, polyarylate, polyethylene terephthalate, polynaphthalene terephthalate, polycarbonate, cyclic polyolefin, a maleimide-based resin, a fluororesin, and polyimide. In addition, a hardcoat layer or a gas barrier layer may also be stacked thereon.

Effects of the Invention

The optical compensation film using the resin composition of the present invention is a thin film exhibiting specific retardation characteristics and therefore, is useful as an optical compensation film or an antireflection film for a liquid crystal display.

EXAMPLES

The present invention is described below by referring to Examples, but the present invention is not limited to these Examples.

Incidentally, various physical properties indicated in Examples were measured by the following methods.

<Analysis of Polymer>

A structural analysis of the polymer was performed using a nuclear magnetic resonance analyzer (trade name: JNM-GX270, manufactured by JEOL Ltd.), and the structure was determined by proton nuclear magnetic resonance spectroscopy ($^1$H-NMR) spectrum analysis.

In the case where the polymer contains a fumaric acid monoester residue unit, when the compositional ratio analysis by $^1$H-NMR spectrum analysis is difficult, the fumaric acid monoester concentration was determined according to JIS K2501 (2003), "Petroleum products and lubricant oils-Testing method for neutralization number."

<Measurement of Number Average Molecular Weight>

Using a gel permeation chromatograph (GPC) (trade name: C0-8011 (equipped with column $GMH_{HR}$-H), manufactured by Tosoh Corp.) and using tetrahydrofuran or dimethylformamide as a solvent, the molecular weight was measured at 40° C. and determined as a value in terms of standard polystyrene.

<Measurements of Light Transmittance and Haze of Optical Compensation Film>

The light transmittance and haze of the film produced were measured using a haze meter (trade name: NDH2000, manufactured by Nippon Denshoku Industries Co., Ltd.), and measurements of light transmittance and haze were performed in conformity with JIS K 7361-1 (1997) and JIS-K 7136 (2000), respectively.

<Measurement of Retardation Characteristics>

The retardation characteristics of the optical compensation film were measured using a sample inclination-type automatic birefringence analyzer (trade name: KOBRA- WR, manufactured by Oji Scientific Instruments) and using light with a wavelength of 589 nm.

<Measurement of Wavelength Dispersion Characteristics>

The wavelength dispersion characteristics of the optical compensation film were measured as a ratio between the retardation Re(450) of light with a wavelength of 450 nm and the retardation Re(550) of light with a wavelength of 550 nm by using a sample inclination-type automatic birefringence analyzer (trade name: KOBRA-WR, manufactured by Oji Scientific Instruments).

Synthesis Example 1 (Synthesis 1 of cinnamic Acid ester Copolymer (monoethyl fumarate/ethyl 4-methoxycinnamate Copolymer))

A 75 mL-volume glass ampoule was charged with 12 g of monoethyl fumarate, 37 g of ethyl 4-methoxycinnamate, and 1.40 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=50/50 (wt %/wt %) and precipitated, and the precipitate was washed with 2 kg of methanol/water=50/50 (wt %/wt %) and then vacuum-dried at 80° C. for 10 hours to obtain 23 g of a monoethyl fumarate/ethyl 4-methoxycinnamate copolymer. In the obtained polymer, the number average molecular weight was 31,000, the concentration of the monoethyl fumarate residue unit was 40 mol %, and the concentration of the ethyl 4-methoxycinnamate residue unit was 60 mol %.

Synthesis Example 2 (Synthesis 2 of cinnamic Acid ester Copolymer (monoethyl fumarate/diisopropyl fumarate/methyl 4-ethoxycinnamate Copolymer))

A 75 mL-volume glass ampoule was charged with 6.3 g of monoethyl fumarate, 15 g of diisopropyl fumarate, 29 g of methyl 4-ethoxycinnamate, and 1.48 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=60/40 (wt %/wt %) and precipitated, and the precipitate was washed with 2 kg of methanol/water=60/40 (wt %/wt %) and then vacuum-dried at 80° C. for 10 hours to obtain 31 g of a monoethyl fumarate/diisopropyl fumarate/methyl 4-ethoxycinnamate copolymer. In the obtained polymer, the number average molecular weight was 38,000, the concentration of the monoethyl fumarate residue unit was 22 mol %, the concentration of the diisopropyl fumarate residue unit was 40 mol %, and the concentration of the methyl 4-ethoxycinnamate residue unit was 38 mol %.

Synthesis Example 3 (Synthesis 3 of cinnamic Acid ester Copolymer (monoisopropyl fumarate/diethyl fumarate/isopropyl 4-methoxycinnamate Copolymer))

A 75 mL-volume glass ampoule was charged with 4.3 g of monoisopropyl fumarate, 13 g of diethyl fumarate, 33 g of isopropyl 4-methoxycinnamate, and 1.46 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 10 hours, thereby performing radical polymerization. After the completion of polymerization reaction, the polymerization product was taken out of the ampoule and dissolved in 50 g of tetrahydrofuran. The resulting polymer solution was added dropwise to methanol/water=60/40 (wt %/wt %) and precipitated, and the precipitate was washed with 2 kg of methanol/water=60/40 (wt %/wt %) and then vacuum-dried at 80° C. for 10 hours to obtain 29 g of a monoisopropyl fumarate/diethyl fumarate/isopropyl 4-methoxycinnamate copolymer. In the obtained polymer, the number average molecular weight was 33,000, the concentration of the monoisopropyl fumarate residue unit was 16 mol %, the concentration of the diethyl fumarate residue unit was 41 mol %, and the concentration of the isopropyl 4-methoxycinnamate residue unit was 43 mol %.

Synthesis Example 4 (Synthesis 4 of cinnamic Acid ester Copolymer (monoethyl fumarate/diethyl fumarate/ethyl 4-methoxycinnamate Copolymer))

A 75 mL-volume glass ampoule was charged with 1.0 g of monoethyl fumarate, 11 g of diethyl fumarate, 39 g of ethyl 4-methoxycinnamate, and 1.43 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 10 hours, thereby performing radical polymerization. After the completion of polymerization reaction, the polymerization product was taken out of the ampoule and dissolved in 50 g of tetrahydrofuran. The resulting polymer solution was added dropwise to methanol/water=60/40 (wt %/wt %) and precipitated, and the precipitate was washed with 2 kg of methanol/water=60/40 (wt %/wt %) and then vacuum-dried at 80° C. for 10 hours to obtain 27 g of a monoethyl fumarate/diethyl fumarate/ethyl 4-methoxycinnamate copolymer. In the obtained polymer, the number average molecular weight was 33,000, the concentration of the monoethyl fumarate residue unit was 4.5 mol %, the concentration of the diethyl fumarate residue unit was 35.5 mol %, and the concentration of the ethyl 4-methoxycinnamate residue unit was 60 mol %.

Synthesis Example 5 (Synthesis 5 of cinnamic Acid ester Copolymer (monoethyl fumarate/diisopropyl fumarate/n-propyl 4-methoxycinnamate Copolymer))

A 75 mL-volume glass ampoule was charged with 5.0 g of monoethyl fumarate, 38 g of diisopropyl fumarate, 7.3 g of n-propyl 4-methoxycinnamate, and 1.46 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to methanol/water=70/30 (wt %/wt %) and precipitated, and the precipitate was washed with 2 kg of methanol/water=70/30 (wt %/wt %) and then vacuum-dried at 80° C. for 10 hours to obtain 24 g of a monoethyl fumarate/diisopropyl fumarate/n-propyl 4-methoxycinnamate copolymer. In the obtained polymer, the number average molecular weight was 31,000, the concentration of the monoethyl fumarate residue unit was 13 mol %, the concentration of the diisopropyl fumarate residue unit was 72 mol %, and the concentration of the n-propyl 4-methoxycinnamate residue unit was 15 mol %.

Synthesis Example 6 (Synthesis 6 of cinnamic Acid ester Copolymer (monoethyl fumarate/diisopropyl fumarate/n-propyl 4-methoxycinnamate Copolymer))

A 75 mL-volume glass ampoule was charged with 1.6 g of monoethyl fumarate, 4.8 g of diisopropyl fumarate, 44 g of n-propyl 4-methoxycinnamate, and 1.18 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 60 hours, thereby performing radical polymerization. After the completion of polymerization reaction, the polymerization product was taken out of the ampoule and dissolved in 50 g of tetrahydrofuran. The resulting polymer solution was added dropwise to hexane and precipitated, and the precipitate was washed with 2 kg of hexane and then vacuum-dried at 80° C. for 10 hours to obtain 11 g of a monoethyl fumarate/diisopropyl fumarate/n-propyl 4-methoxycinnamate copolymer. In the obtained polymer, the number average molecular weight was 36,000, the concentration of the monoethyl fumarate residue unit was 7 mol %, the concentration of the diisopropyl fumarate residue unit was 11 mol %, and the concentration of the n-propyl 4-methoxycinnamate residue unit was 82 mol %.

Synthesis Example 7 (Synthesis 7 of cinnamic Acid ester copolymer (diisopropyl fumarate/N-(n-butoxymethyl)acrylamide/ethyl 4-methoxycinnamate Copolymer))

A 75 mL-volume glass ampoule was charged with 10 g of diisopropyl fumarate, 5.0 g of N-(n-butoxymethyl)acrylamide, 35 g of ethyl 4-methoxycinnamate, and 1.44 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=60/40 (wt %/wt %) and precipitated, and the precipitate was washed with 2 kg of methanol/water-60/40 (wt %/wt %) and then vacuum-dried at 80° C. for 10 hours to obtain 24 g of a diisopropyl fumarate/N-(n-butoxymethyl)acrylamide/ethyl 4-methoxycinnamate copolymer. In the obtained polymer, the number average molecular weight was 24,000, the concentration of the diisopropyl fumarate residue unit was 35 mol %, the concentration of the N-(n-butoxymethyl)acrylamide residue unit was 15 mol %, and the concentration of the ethyl 4-methoxycinnamate residue unit was 50 mol %.

Synthesis Example 8 (Synthesis 8 of cinnamic Acid ester Copolymer (diethyl fumarate/2-hydroxyethyl acrylate/ethyl 4-methoxycinnamate Copolymer))

A 75 mL-volume glass ampoule was charged with 9.3 g of diethyl fumarate, 3.7 g of 2-hydroxyethyl acrylate, 37 g of ethyl 4-methoxycinnamate, and 1.52 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=60/40 (wt %/wt %) and precipitated, and the precipitate was washed with 2 kg of methanol/water=60/40 (wt %/wt %) and then vacuum-dried at 80° C. for 10 hours to obtain 22 g of a diethyl fumarate/2-hydroxyethyl acrylate/ethyl 4-methoxycinnamate copolymer. In the obtained polymer, the number average molecular weight was 22,000, the concentration of the diethyl fumarate residue unit was 36 mol %, the concentration of the 2-hydroxyethyl acrylate residue unit was 14 mol %, and the concentration of the ethyl 4-methoxycinnamate residue unit was 50 mol %.

Synthesis Example 9 (Synthesis 9 of cinnamic Acid ester Copolymer (diisopropyl fumarate/2-hydroxyethyl acrylate/ethyl 4-methoxycinnamate Copolymer))

A 75 mL-volume glass ampoule was charged with 23 g of diisopropyl fumarate, 2.3 g of 2-hydroxyethyl acrylate, 25 g of ethyl 4-methoxycinnamate, and 1.50 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=60/40 (wt %/wt %) and precipitated, and the precipitate was washed with 2 kg of methanol/water=60/40 (wt %/wt %) and then vacuum-dried at 80° C. for 10 hours to obtain 29 g of a diisopropyl fumarate/2-hydroxyethyl acrylate/ethyl 4-methoxycinnamate copolymer. In the obtained polymer, the number average molecular weight was 36,000, the concentration of the diisopropyl fumarate residue unit was 58 mol %, the concentration of the 2-hydroxyethyl acrylate residue unit was 10 mol %, and the concentration of the ethyl 4-methoxycinnamate residue unit was 32 mol %.

Synthesis Example 10 (Synthesis 10 of cinnamic Acid ester Copolymer (diisopropyl fumarate/2-hydroxyethyl acrylate/ethyl 4-methoxycinnamate Copolymer))

A 75 mL-volume glass ampoule was charged with 18 g of diisopropyl fumarate, 0.30 g of 2-hydroxyethyl acrylate, 32.0 g of ethyl 4-methoxycinnamate, and 1.45 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 60° C. and held for 48 hours, thereby performing radical polymerization. After the completion of polymerization reaction, the polymerization product was taken out of the ampoule and dissolved in 50 g of tetrahydrofuran. The resulting polymer solution was added dropwise to 2 kg of methanol/water=60/40 (wt %/wt %) and precipitated, and the precipitate was washed with 2 kg of methanol/water=60/40 (wt %/wt %) and then vacuum-dried at 80° C. for 10 hours to obtain 27 g of a diisopropyl fumarate/2-hydroxyethyl acrylate/ethyl 4-methoxycinnamate copolymer. In the obtained polymer, the number average molecular weight was 37,000, the concentration of the diisopropyl fumarate residue unit was 57 mol %, the concentration of the 2-hydroxyethyl acrylate residue unit was 3 mol %, and the concentration of the ethyl 4-methoxycinnamate residue unit was 40 mol %.

Synthesis Example 11 (Synthesis 11 of cinnamic Acid ester Copolymer (diisopropyl fumarate/monoethyl fumarate/ethyl 4-nitrocinnamate Copolymer))

A 75 mL-volume glass ampoule was charged with 57 g of diisopropyl fumarate, 5.1 g of monoethyl fumarate, 3.9 g of ethyl 4-nitrocinnamate, and 1.46 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 62° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 22 g of a diisopropyl fumarate/monoethyl fumarate/ethyl 4-nitrocinnamate copolymer. In the obtained polymer, the number average molecular weight was 18,000, the concentration of the diisopropyl fumarate residue unit was 78 mol %, the concentration of the monoethyl fumarate residue unit was 12 mol %, and the concentration of the ethyl 4-nitrocinnamate residue unit was 10 mol %.

Synthesis Example 12 (Synthesis 12 of cinnamic Acid ester Copolymer (diisopropyl fumarate/monoisopropyl fumarate/ethyl 4-nitrocinnamate Copolymer))

A 75 mL-volume glass ampoule was charged with 53 g of diisopropyl fumarate, 5.8 g of monoisopropyl fumarate, 6.0 g of ethyl 4-nitrocinnamate, and 1.91 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 31 g of a diisopropyl fumarate/monoisopropyl fumarate/ethyl 4-nitrocinnamate copolymer. In the obtained polymer, the number average molecular weight was 16,000, the concentration of the diisopropyl fumarate residue unit was 68 mol %, the concentration of the monoisopropyl fumarate residue unit was 15 mol %, and the concentration of the ethyl 4-nitrocinnamate residue unit was 17 mol %.

Synthesis Example 13 (Synthesis 13 of cinnamic Acid ester Copolymer (diisopropyl fumarate/monoisopropyl fumarate/ethyl 4-nitrocinnamate Copolymer))

A 75 mL-volume glass ampoule was charged with 48 g of diisopropyl fumarate, 5.7 g of monoisopropyl fumarate, 11.0 g of ethyl 4-nitrocinnamate, and 0.567 g of 1,1'-azobis(cyclohexane-1-carbonitrile) as a polymerization initiator and after repeating nitrogen substitution and release of the pressure, sealed in the pressure-reduced state. This ampoule was placed in a constant temperature bath at 80° C. and held for 144 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 10 g of a diisopropyl fumarate/monoisopropyl fumarate/ethyl 4-nitrocinnamate copolymer. In the obtained polymer, the number average molecular weight was 13,000, the concentration of the diisopropyl fumarate residue unit was 51 mol %, the concentration of the monoisopropyl fumarate residue unit was 16 mol %, and the concentration of the ethyl 4-nitrocinnamate residue unit was 33 mol %.

Synthesis Example 14 (Synthesis 14 of cinnamic Acid ester Copolymer (diisopropyl fumarate/monoethyl fumarate/ethyl 4-cyanocinnamate Copolymer))

A 75 mL-volume glass ampoule was charged with 40 g of diisopropyl fumarate, 4.9 g of monoethyl fumarate, 5.2 g of ethyl 4-cyanocinnamate, and 1.49 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 17 g of a diisopropyl fumarate/monoethyl fumarate/ethyl 4-cyanocinnamate copolymer. In the obtained polymer, the number average molecular weight was 25,000, the concentration of the diisopropyl fumarate residue unit was 78 mol %, the concentration of the monoethyl fumarate residue unit was 9 mol %, and the concentration of the ethyl 4-cyanocinnamate residue unit was 13 mol %.

Synthesis Example 15 (Synthesis 15 of cinnamic Acid ester Copolymer (diisopropyl fumarate/monoethyl fumarate/ethyl 4-cyanocinnamate Copolymer))

A 75 mL-volume glass ampoule was charged with 45 g of diisopropyl fumarate, 6.0 g of monoethyl fumarate, 12.9 g of ethyl 4-cyanocinnamate, and 1.929 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 14 g of a diisopropyl fumarate/monoethyl fumarate/ethyl 4-cyanocinnamate copolymer. In the obtained polymer, the number average molecular weight was 17,000, the concentration of the diisopropyl fumarate residue unit was 58 mol %, the concentration of the monoethyl fumarate residue unit was 10 mol %, and the concentration of the ethyl 4-cyanocinnamate residue unit was 32 mol %.

Synthesis Example 16 (Synthesis 16 of cinnamic Acid ester Copolymer (diisopropyl fumarate/monoethyl fumarate/ethyl 4-bromocinnamate Copolymer))

A 75 mL-volume glass ampoule was charged with 47 g of diisopropyl fumarate, 7.2 g of monoethyl fumarate, 11.0 g of ethyl 4-bromocinnamate, and 1.91 g of 2,5-dimethyl-2,5-di (2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 33 g of a diisopropyl fumarate/monoethyl fumarate/ethyl 4-bromocinnamate copolymer. In the obtained polymer, the number average molecular weight was 25,000, the concentration of the diisopropyl fumarate residue unit was 73 mol %, the concentration of the monoethyl fumarate residue unit was 12 mol %, and the concentration of the ethyl 4-bromocinnamate residue unit was 15 mol %.

Synthesis Example 17 (Synthesis 17 of cinnamic Acid ester Copolymer (diisopropyl fumarate/monoethyl fumarate/ethyl 4-nitrocinnamate Copolymer))

A 75 mL-volume glass ampoule was charged with 59 g of diisopropyl fumarate, 2.5 g of monoethyl fumarate, 3.8 g of ethyl 4-nitrocinnamate, and 1.99 g of 2,5-dimethyl-2,5-di (2-ethylhexanoylperoxy)hexane as a polymerization initiator and after repeating nitrogen substitution and release of the pressure, sealed in the pressure-reduced state. This ampoule was placed in a constant temperature bath at 62° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 30 g of a diisopropyl fumarate/monoethyl fumarate/ethyl 4-nitrocinnamate copolymer. In the obtained polymer, the number average molecular weight was 24,000, the concentration of the diisopropyl fumarate residue unit was 87 mol %, the concentration of the monoethyl fumarate residue unit was 4 mol %, and the concentration of the ethyl 4-nitrocinnamate residue unit was 9 mol %.

Synthesis Example 18 (Synthesis 18 of cinnamic Acid ester Copolymer (diisopropyl fumarate/monoethyl fumarate/ethyl 4-cyanocinnamate Copolymer))

A 75 mL-volume glass ampoule was charged with 58 g of diisopropyl fumarate, 3.0 g of monoethyl fumarate, 7.0 g of ethyl 4-cyanocinnamate, and 1.90 g of 2,5-dimethyl-2,5-di (2-ethylhexanoylperoxy)hexane as a polymerization initiator and after repeating nitrogen substitution and release of the pressure, sealed in the pressure-reduced state. This ampoule was placed in a constant temperature bath at 62° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 16 g of a diisopropyl fumarate/monoethyl fumarate/ethyl 4-cyanocinnamate copolymer. In the obtained polymer, the number average molecular weight was 21,000, the concentration of the diisopropyl fumarate residue unit was 81 mol %, the concentration of the monoethyl fumarate residue unit was 4 mol %, and the concentration of the ethyl 4-cyanocinnamate residue unit was 15 mol %.

Synthesis Example 19 (Synthesis 19 of cinnamic Acid ester Copolymer (diethyl fumarate/monoethyl fumarate/ethyl 4-nitrocinnamate Copolymer))

A 75 mL-volume glass ampoule was charged with 58 g of diethyl fumarate, 2.7 g of monoethyl fumarate, 4.1 g of ethyl 4-nitrocinnamate, and 2.17 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 27 g of a diethyl fumarate/monoethyl fumarate/ethyl 4-nitrocinnamate copolymer. In the obtained polymer, the number average molecular weight was 16,000, the concentration of the diethyl fumarate residue unit was 84 mol %, the concentration of the monoethyl fumarate residue unit was 6 mol %, and the concentration of the ethyl 4-nitrocinnamate residue unit was 10 mol %.

Synthesis Example 20 (Synthesis 20 of cinnamic Acid ester Copolymer (diethyl fumarate/ethyl 4-nitrocinnamate Copolymer))

A 75 mL-volume glass ampoule was charged with 53 g of diethyl fumarate, 12 g of ethyl 4-nitrocinnamate, and 0.567 g of 1,1'-azobis(cyclohexane-1-carbonitrile) as a polymerization initiator and after repeating nitrogen substitution and release of the pressure, sealed in the pressure-reduced state. This ampoule was placed in a constant temperature bath at 80° C. and held for 144 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 13 g of a diethyl fumarate/ethyl 4-nitrocinnamate copolymer. In the obtained polymer, the number average molecular weight was 13,000, the concentration of the diethyl fumarate residue unit was 69 mol %, and the concentration of the ethyl 4-nitrocinnamate residue unit was 31 mol %.

Synthesis Example 21 (Synthesis 21 of cinnamic Acid ester Copolymer (diethyl fumarate/monoethyl fumarate/ethyl 4-cyanocinnamate Copolymer))

A 75 mL-volume glass ampoule was charged with 57 g of diethyl fumarate, 2.7 g of monoethyl fumarate, 5.2 g of ethyl 4-cyanocinnamate, and 2.17 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 33 g of a diethyl fumarate/monoethyl fumarate/ethyl 4-cyanocinnamate copolymer. In the obtained polymer, the number average molecular weight was 21,000, the concentration of the diethyl fumarate residue unit was 85 mol %, the concentration of the monoethyl fumarate residue unit was 5 mol %, and the concentration of the ethyl 4-cyanocinnamate residue unit was 10 mol %.

Synthesis Example 22 (Synthesis 22 of cinnamic Acid ester Copolymer (diethyl fumarate/ethyl 4-cyanocinnamate Copolymer))

A 75 mL-volume glass ampoule was charged with 54 g of diethyl fumarate, 11.0 g of ethyl 4-cyanocinnamate, and 2.12 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 15 g of a diethyl fumarate/ethyl 4-cyanocinnamate copolymer. In the obtained polymer, the number average molecular weight was 15,000, the concentration of the diethyl fumarate residue unit was 68 mol %, and the concentration of the ethyl 4-cyanocinnamate residue unit was 32 mol %.

Synthesis Example 23 (Synthesis 23 of cinnamic Acid ester Copolymer (diethyl fumarate/monoethyl fumarate/ethyl 4-bromocinnamate Copolymer))

A 75 mL-volume glass ampoule was charged with 52 g of diethyl fumarate, 3.2 g of monoethyl fumarate, 9.8 g of ethyl 4-bromocinnamate, and 2.17 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 34 g of a diethyl fumarate/monoethyl fumarate/ethyl 4-bromocinnamate copolymer. In the obtained polymer, the number average molecular weight was 23,000, the concentration of the diethyl fumarate residue unit was 83 mol %, the concentration of the monoethyl fumarate residue unit was 5 mol %, and the concentration of the ethyl 4-bromocinnamate residue unit was 12 mol %.

Synthesis Example 24 (Synthesis of di-tert-butyl fumarate)

After charging 60 mL of ethylene glycol dimethyl ether, 20 g of maleic acid and 4 g of sulfuric acid into a 300-mL autoclave equipped with a stirrer and a thermometer, 51 g of 2-methylpropylene was charged under pressure and reacted at 40° C. for 2 hours while stirring.

Subsequently, 80 mL of an ethylene glycol dimethyl ether solution of di-tert-butyl maleate, obtained by neutralizing and water-washing the reaction solution obtained by the reaction above, and 0.3 g of piperidine were charged into a 150-mL three-neck flask equipped with a stirrer, a condenser and a thermometer and reacted at 110° C. for 2 hours while stirring. The obtained reaction solution was GC-analyzed, as a result, the rate of isomerization to di-tert-butyl fumarate was 99%. The solvent of the obtained reaction solution was distilled off, and the residue was sublimated to obtain 22 g of di-tert-butyl fumarate with a purity of 99%.

Synthesis Example 25 (Synthesis 24 of cinnamic Acid ester Copolymer (di-tert-butyl fumarate/monoethyl fumarate/ethyl 4-nitrocinnamate Copolymer))

A 75 mL-volume glass ampoule was charged with 57 g of di-tert-butyl fumarate, 5.7 g of monoethyl fumarate, 3.4 g of ethyl 4-nitrocinnamate, and 1.75 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 62° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 26 g of a di-tert-butyl fumarate/monoethyl fumarate/ethyl 4-nitrocinnamate copolymer. In the obtained polymer, the number average molecular weight was 22,000, the concentration of the di-tert-butyl fumarate residue unit was 77 mol %, the concentration of the monoethyl fumarate residue unit was 13 mol %, and the concentration of the ethyl 4-nitrocinnamate residue unit was 10 mol %.

Synthesis Example 26 (Synthesis 25 of cinnamic Acid ester Copolymer (di-tert-butyl fumarate/monoisopropyl fumarate/ethyl 4-nitrocinnamate Copolymer))

A 75 mL-volume glass ampoule was charged with 53 g of di-tert-butyl fumarate, 5.8 g of monoisopropyl fumarate, 5.5 g of ethyl 4-nitrocinnamate, and 1.75 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 33 g of a di-tert-butyl fumarate/monoisopropyl fumarate/ethyl 4-nitrocinnamate copolymer. In the obtained polymer, the number average molecular weight was 18,000, the concentration of the di-tert-butyl fumarate residue unit was 69 mol %, the concentration of the monoisopropyl fumarate residue unit was 15 mol %, and the concentration of the ethyl 4-nitrocinnamate residue unit was 16 mol %.

Synthesis Example 27 (Synthesis 26 of cinnamic Acid ester Copolymer (di-tert-butyl fumarate/monoisopropyl fumarate/ethyl 4-nitrocinnamate Copolymer))

A 75 mL-volume glass ampoule was charged with 48 g of di-tert-butyl fumarate, 5.3 g of monoisopropyl fumarate, 10.1 g of ethyl 4-nitrocinnamate, and 0.823 g of 1,1'-azobis(cyclohexane-1-carbonitrile) as a polymerization initiator and after repeating nitrogen substitution and release of the pressure, sealed in the pressure-reduced state. This ampoule was placed in a constant temperature bath at 80° C. and held for 144 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 13 g of a di-tert-butyl fumarate/monoisopropyl fumarate/ethyl 4-nitrocinnamate copolymer. In the obtained polymer, the number average molecular weight was 15,000, the concentration of the di-tert-butyl fumarate residue unit was 53 mol %, the concentration of the monoisopropyl fumarate residue unit was 15 mol %, and the concentration of the ethyl 4-nitrocinnamate residue unit was 32 mol %.

Synthesis Example 28 (Synthesis 27 of cinnamic Acid ester Copolymer (di-tert-butyl fumarate/monoethyl fumarate/ethyl 4-cyanocinnamate Copolymer))

A 75 mL-volume glass ampoule was charged with 40 g of di-tert-butyl fumarate, 4.0 g of monoethyl fumarate, 4.7 g of ethyl 4-cyanocinnamate, and 1.49 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 21 g of a di-tert-butyl fumarate/monoethyl fumarate/ethyl 4-cyanocinnamate copolymer. In the obtained polymer, the number average molecular weight was 28,000, the concentration of the di-tert-butyl fumarate residue unit was 77 mol %, the concentration of the monoethyl fumarate residue unit was 10 mol %, and the concentration of the ethyl 4-cyanocinnamate residue unit was 13 mol %.

Synthesis Example 29 (Synthesis 28 of cinnamic Acid ester Copolymer (di-tert-butyl fumarate/monoethyl fumarate/ethyl 4-cyanocinnamate Copolymer))

A 75 mL-volume glass ampoule was charged with 45 g of di-tert-butyl fumarate, 5.1 g of monoethyl fumarate, 11.0 g of ethyl 4-cyanocinnamate, and 1.696 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 15 g of a di-tert-butyl fumarate/monoethyl fumarate/ethyl 4-cyanocinnamate copolymer. In the obtained polymer, the number average molecular weight was 19,000, the concentration of the di-tert-butyl fumarate residue unit was 58 mol %, the concentration of the monoethyl fumarate residue unit was 9 mol %, and the concentration of the ethyl 4-cyanocinnamate residue unit was 33 mol %.

Synthesis Example 30 (Synthesis 29 of cinnamic Acid ester Copolymer (di-tert-butyl fumarate/monoethyl fumarate/ethyl 4-bromocinnamate Copolymer))

A 75 mL-volume glass ampoule was charged with 47 g of di-tert-butyl fumarate, 6.0 g of monoethyl fumarate, 9.6 g of ethyl 4-bromocinnamate, and 1.70 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/ water=60/40 (wt %/wt %) and then vacuum-dried at 80° C. for 10 hours to obtain 38 g of a di-tert-butyl fumarate/monoethyl fumarate/ethyl 4-bromocinnamate copolymer. In the obtained polymer, the number average molecular weight was 30,000, the concentration of the di-tert-butyl fumarate residue unit was 74 mol %, the concentration of the monoethyl fumarate residue unit was 11 mol %, and the concentration of the ethyl 4-bromocinnamate residue unit was 15 mol %.

Synthesis Example 31 (Synthesis 30 of cinnamic Acid ester Copolymer (di-tert-butyl fumarate/monoethyl fumarate/ethyl 4-nitrocinnamate Copolymer))

A 75 mL-volume glass ampoule was charged with 59 g of di-tert-butyl fumarate, 2.1 g of monoethyl fumarate, 3.2 g of ethyl 4-nitrocinnamate, and 1.68 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 62° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 35 g of a di-tert-butyl fumarate/monoethyl fumarate/ethyl 4-nitrocinnamate copolymer. In the obtained polymer, the number average molecular weight was 29,000, the concentration of the di-tert-butyl fumarate residue unit was 87 mol %, the concentration of the monoethyl fumarate residue unit was 4 mol %, and the concentration of the ethyl 4-nitrocinnamate residue unit was 9 mol %.

Synthesis Example 32 (Synthesis 31 of cinnamic Acid ester Copolymer (diisopropyl fumarate/diethyl fumarate/2-hydroxyethyl acrylate/ethyl 4-nitrocinnamate Copolymer))

A 75 mL-volume glass ampoule was charged with 49 g of diisopropyl fumarate, 6.7 g of diethyl fumarate, 4.0 g of 2-hydroxyethyl acrylate, 4.9 g of ethyl 4-nitrocinnamate, and 1.97 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 27 g of a diisopropyl fumarate/diethyl fumarate/2-hydroxyethyl acrylate/ethyl 4-nitrocinnamate copolymer. In the obtained polymer, the number average molecular weight was 21,000, the concentration of the diisopropyl fumarate residue unit was 69 mol %, the concentration of the diethyl fumarate residue unit was 10 mol %, the concentration of the 2-hydroxyethyl acrylate residue unit was 10 mol %, and the concentration of the ethyl 4-nitrocinnamate residue unit was 11 mol %.

Synthesis Example 33 (Synthesis 32 of cinnamic Acid ester Copolymer (diisopropyl fumarate/N-(n-butoxymethyl)acrylamide/ethyl 4-nitrocinnamate Copolymer))

A 75 mL-volume glass ampoule was charged with 50 g of diisopropyl fumarate, 8.0 g of N-(n-butoxymethyl)acrylamide, 6.8 g of ethyl 4-nitrocinnamate, and 1.91 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 28 g of a diisopropyl fumarate/N-(n-butoxymethyl)acrylamide/ethyl 4-nitrocinnamate copolymer. In the obtained polymer, the number average molecular weight was 15,000, the concentration of the diisopropyl fumarate residue unit was 70 mol %, the concentration of the N-(n-butoxymethyl)acrylamide residue unit was 15 mol %, and the concentration of the ethyl 4-nitrocinnamate residue unit was 15 mol %.

Synthesis Example 34 (Synthesis 33 of cinnamic Acid ester Copolymer (diisopropyl fumarate/diethyl fumarate/2-hydroxyethyl acrylate/ethyl 4-nitrocinnamate Copolymer))

A 75 mL-volume glass ampoule was charged with 42 g of diisopropyl fumarate, 6.3 g of diethyl fumarate, 4.0 g of 2-hydroxyethyl acrylate, 11.0 g of ethyl 4-nitrocinnamate, and 0.918 g of 1,1'-azobis(cyclohexane-1-carbonitrile) as a polymerization initiator and after repeating nitrogen substitution and release of the pressure, sealed in the pressure-reduced state. This ampoule was placed in a constant temperature bath at 80° C. and held for 144 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 10 g of a diisopropyl fumarate/diethyl fumarate/2-hydroxyethyl acrylate/ethyl 4-nitrocinnamate copolymer. In the obtained polymer, the number average molecular weight was 11,000, the concentration of the diisopropyl fumarate residue unit was 47 mol %, the concentration of the diethyl fumarate residue unit was 10 mol %, the concentration of the 2-hydroxyethyl acrylate residue unit was 9 mol %, and the concentration of the ethyl 4-nitrocinnamate residue unit was 34 mol %.

Synthesis Example 35 (Synthesis 34 of cinnamic Acid ester Copolymer (diisopropyl fumarate/diethyl fumarate/2-hydroxyethyl acrylate/ethyl 4-cyanocinnamate Copolymer))

A 75 mL-volume glass ampoule was charged with 41 g of diisopropyl fumarate, 6.7 g of diethyl fumarate, 4.0 g of 2-hydroxyethyl acrylate, 13.0 g of ethyl 4-cyanocinnamate, and 1.97 g of 2,5-dimethyl-2,5-di(2-ethylhexanoylperoxy)

hexane as a polymerization initiator and after repeating nitrogen substitution and release of the pressure, sealed in the pressure-reduced state. This ampoule was placed in a constant temperature bath at 65° C. and held for 120 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 12 g of a diisopropyl fumarate/diethyl fumarate/2-hydroxyethyl acrylate/ethyl 4-cyanocinnamate copolymer. In the obtained polymer, the number average molecular weight was 15,000, the concentration of the diisopropyl fumarate residue unit was 45 mol %, the concentration of the diethyl fumarate residue unit was 11 mol %, the concentration of the 2-hydroxyethyl acrylate residue unit was 11 mol %, and the concentration of the ethyl 4-cyanocinnamate residue unit was 33 mol %.

Synthesis Example 36 (Synthesis 35 of cinnamic Acid ester Copolymer (diisopropyl fumarate/N-(n-butoxymethyl)acrylamide/ethyl 4-bromocinnamate Copolymer))

A 75 mL-volume glass ampoule was charged with 47 g of diisopropyl fumarate, 7.1 g of N-(n-butoxymethyl)acrylamide, 10.7 g of ethyl 4-bromocinnamate, and 1.85 g of 2,5-dimethyl-2,5-di(2-ethylhexanoylperoxy)hexane as a polymerization initiator and after repeating nitrogen substitution and release of the pressure, sealed in the pressure-reduced state. This ampoule was placed in a constant temperature bath at 65° C. and held for 72 hours, thereby performing radical polymerization. After the completion of polymerization reaction, the polymerization product was taken out of the ampoule and dissolved in 50 g of tetrahydrofuran. The resulting polymer solution was added dropwise to 2 kg of hexane and precipitated, and the precipitate was washed with 2 kg of methanol/water=60/40 (wt %/wt %) and then vacuum-dried at 80° C. for 10 hours to obtain 31 g of a diisopropyl fumarate/N-(n-butoxymethyl)acrylamide/ethyl 4-bromocinnamate copolymer. In the obtained polymer, the number average molecular weight was 21,000, the concentration of the diisopropyl fumarate residue unit was 72 mol %, the concentration of the N-(n-butoxymethyl) acrylamide residue unit was 13 mol %, and the concentration of the ethyl 4-bromocinnamate residue unit was 15 mol %.

Example 1

105 g of ethyl cellulose (ETHOCEL standard 100, produced by Dow Chemical Co., molecular weight Mn=55,000, molecular weight Mw=176,000, Mw/Mn=3.2, total degree of substitution DS=2.5) as the cellulose-based resin and 45 g of the monoethyl fumarate/ethyl 4-methoxycinnamate copolymer obtained in Synthesis Example 1 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 70 wt %, monoethyl fumarate/ethyl 4-methoxycinnamate copolymer: 30 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown in Table 1.

TABLE 1

|  | Light Transmittance (%) | Haze (%) | Re (nm) | Re/Thickness (nm/μm) | Rth (nm) | Nz Coefficient | Re(450)/Re(550) |
|---|---|---|---|---|---|---|---|
| Example 1 | 93 | 0.7 | 270 | 9.0 | 18 | 0.57 | 0.95 |
| Example 2 | 93 | 0.5 | 282 | 9.4 | 36 | 0.63 | 0.95 |
| Example 3 | 92 | 0.7 | 234 | 7.8 | 18 | 0.58 | 0.94 |
| Example 4 | 75 | 5.8 | 264 | 8.8 | −9 | 0.47 | 0.94 |
| Example 5 | 93 | 0.4 | 153 | 5.1 | 13 | 0.59 | 0.94 |
| Example 6 | 93 | 0.6 | 270 | 9.0 | 2 | 0.51 | 0.95 |
| Example 7 | 92 | 0.7 | 231 | 7.7 | 5 | 0.52 | 0.93 |
| Example 8 | 92 | 0.8 | 228 | 7.6 | 0 | 0.50 | 0.93 |
| Example 9 | 92 | 0.8 | 192 | 6.4 | 9 | 0.55 | 0.92 |
| Example 10 | 68 | 12 | 252 | 8.4 | −5 | 0.48 | 0.94 |

The obtained optical compensation film had high light transmittance, excellent transparency, small haze, and target optical properties in terms of in-plane retardation (Re) and Nz coefficient, and had a large Re(589)/film thickness ratio.

Example 2

105 g of the ethyl cellulose used in Example 1 and 45 g of the monoethyl fumarate/diisopropyl fumarate/methyl 4-ethoxycinnamate copolymer obtained in Synthesis Example 2 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 70 wt %, monoethyl fumarate/diisopropyl fumarate/methyl 4-ethoxycinnamate copolymer: 30 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 3

97 g of the ethyl cellulose used in Example 1 and 53 g of the monoisopropyl fumarate/diethyl fumarate/isopropyl 4-methoxycinnamate copolymer obtained in Synthesis Example 3 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, monoisopropyl fumarate/diethyl fumarate/isopropyl 4-methoxycinnamate copolymer: 35 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 4

105 g of the ethyl cellulose used in Example 1 and 45 g of the monoethyl fumarate/diethyl fumarate/ethyl 4-methoxycinnamate copolymer obtained in Synthesis Example 4 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 70 wt %, monoethyl fumarate/diethyl fumarate/ethyl 4-methoxycinnamate copolymer: 30 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had target optical properties in terms of in-plane retardation (Re) and Nz coefficient and had a large Re(589)/film thickness ratio.

Example 5

92 g of the ethyl cellulose used in Example 1 and 58 g of the monoethyl fumarate/diisopropyl fumarate/n-propyl 4-methoxycinnamate copolymer obtained in Synthesis Example 5 were dissolved in toluene:acetone=95:5 (weight ratio) to make a 18 wt % resin solution, and the resin solution was cast on a polyethylene terephthalate film by means of a coater and dried in two stages of drying at a drying temperature of 60° C. and then at 140° C. to obtain an optical compensation film (resin composition) having a width of 150 mm (ethyl cellulose: 60 wt %, monoethyl fumarate/diisopropyl fumarate/n-propyl 4-methoxycinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 6

112 g of the ethyl cellulose used in Example 1 and 38 g of the monoethyl fumarate/diisopropyl fumarate/n-propyl 4-methoxycinnamate copolymer obtained in Synthesis Example 6 were dissolved in toluene:acetone=90:10 (weight ratio) to make a 18 wt % resin solution, and the resin solution was cast on a polyethylene terephthalate film by means of a coater and dried in two stages of drying at a drying temperature of 60° C. and then at 140° C. to obtain an optical compensation film (resin composition) having a width of 150 mm (ethyl cellulose: 75 wt %, monoethyl fumarate/diisopropyl fumarate/n-propyl 4-methoxycinnamate copolymer: 25 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 7

97 g of the ethyl cellulose (ETHOCEL standard 100, produced by Dow Chemical Co., molecular weight Mn=55,000, molecular weight Mw=176,000, Mw/Mn=3.2, total degree of substitution DS=2.5) used in Example 1 and 53 g of the diisopropyl fumarate/N-(n-butoxymethyl)acrylamide/ethyl 4-methoxycinnamate copolymer obtained in Synthesis Example 7 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/N-(n-butoxymethyl)acrylamide/ethyl 4-methoxycinnamate copolymer: 35 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 8

97 g of the ethyl cellulose used in Example 1 and 53 g of the diethyl fumarate/2-hydroxyethyl acrylate/ethyl 4-methoxycinnamate copolymer obtained in Synthesis Example 8 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diethyl fumarate/2-hydroxyethyl acrylate/ethyl 4-methoxycinnamate copolymer: 35 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 9

90 g of the ethyl cellulose used in Example 1 and 60 g of the diisopropyl fumarate/2-hydroxyethyl acrylate/ethyl 4-methoxycinnamate copolymer obtained in Synthesis Example 9 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/2-hydroxyethyl acrylate/ethyl 4-methoxycinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had high light transmittance, excellent transparency, small haze, and target optical properties in terms of in-plane retardation (Re) and Nz coefficient, and had a large Re(589)/film thickness ratio.

Example 10

97 g of the ethyl cellulose used in Example 1 and 53 g of the diisopropyl fumarate/2-hydroxyethyl acrylate/ethyl 4-methoxycinnamate copolymer obtained in Synthesis Example 10 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 65 wt %, diisopropyl fumarate/2-hydroxyethyl acrylate/ethyl 4-methoxycinnamate copolymer: 35 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 1.

The obtained optical compensation film had target optical properties in terms of in-plane retardation (Re) and Nz coefficient and had a large Re(589)/film thickness ratio.

Example 11

80 g of ethyl cellulose (ETHOCEL standard 100, produced by Dow Chemical Co., molecular weight Mn=55,000, molecular weight Mw=176,000, Mw/Mn=3.2, total degree of substitution DS=2.5) as the cellulose-based resin and 70 g of the diisopropyl fumarate/monoethyl fumarate/ethyl 4-nitrocinnamate copolymer obtained in Synthesis Example 11 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 53 wt %, diisopropyl fumarate/monoethyl fumarate/ethyl 4-nitrocinnamate copolymer: 47 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown in Table 2.

TABLE 2

|  | Light Transmittance (%) | Haze (%) | Re (nm) | Re/Thickness (nm/μm) | Rth (nm) | Nz Coefficient | Re(450)/Re(550) |
|---|---|---|---|---|---|---|---|
| Example 11 | 92 | 0.7 | 183 | 6.1 | −5 | 0.48 | 0.88 |
| Example 12 | 93 | 0.5 | 210 | 7.0 | 9 | 0.54 | 0.91 |
| Example 13 | 93 | 0.4 | 285 | 9.5 | 23 | 0.58 | 0.95 |
| Example 14 | 91 | 0.8 | 153 | 5.1 | 14 | 0.59 | 0.86 |
| Example 15 | 92 | 0.7 | 189 | 6.3 | 14 | 0.57 | 0.90 |
| Example 16 | 93 | 0.5 | 129 | 4.3 | 5 | 0.53 | 0.85 |
| Example 17 | 83 | 2.6 | 156 | 5.2 | −14 | 0.41 | 0.85 |
| Example 18 | 85 | 2.3 | 159 | 5.3 | 14 | 0.58 | 0.82 |
| Example 19 | 92 | 0.6 | 171 | 5.7 | 9 | 0.55 | 0.88 |
| Example 20 | 91 | 0.8 | 243 | 8.1 | 23 | 0.59 | 0.93 |
| Example 21 | 92 | 0.6 | 135 | 4.5 | 13 | 0.60 | 0.92 |
| Example 22 | 91 | 0.7 | 177 | 5.9 | 13 | 0.58 | 0.92 |
| Example 23 | 92 | 0.6 | 123 | 4.1 | 5 | 0.54 | 0.87 |
| Example 24 | 92 | 0.7 | 175 | 5.9 | −2 | 0.49 | 0.88 |
| Example 25 | 92 | 0.7 | 215 | 7.2 | 7 | 0.53 | 0.90 |
| Example 26 | 92 | 0.7 | 282 | 9.4 | 27 | 0.60 | 0.95 |
| Example 27 | 91 | 0.9 | 141 | 4.7 | 13 | 0.60 | 0.87 |
| Example 28 | 91 | 0.9 | 197 | 6.6 | 7 | 0.53 | 0.91 |
| Example 29 | 92 | 0.7 | 133 | 4.4 | 1 | 0.51 | 0.84 |
| Example 30 | 81 | 4.9 | 159 | 5.3 | −23 | 0.36 | 0.84 |
| Example 31 | 92 | 0.6 | 141 | 4.7 | 13 | 0.60 | 0.87 |
| Example 32 | 92 | 0.7 | 177 | 5.9 | 13 | 0.58 | 0.91 |
| Example 33 | 93 | 0.5 | 249 | 8.3 | 23 | 0.59 | 0.94 |
| Example 34 | 91 | 0.8 | 165 | 5.5 | 13 | 0.58 | 0.88 |
| Example 35 | 92 | 0.7 | 123 | 4.1 | 13 | 0.61 | 0.85 |

The obtained optical compensation film had high light transmittance, excellent transparency, small haze, and target optical properties in terms of in-plane retardation (Re) and Nz coefficient, and had a large Re(589)/film thickness ratio.

Example 12

90 g of the ethyl cellulose used in Example 1 and 60 g of the diisopropyl fumarate/monoisopropyl fumarate/ethyl 4-nitrocinnamate copolymer obtained in Synthesis Example 12 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/monoisopropyl fumarate/ethyl 4-nitrocinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 13

105 g of the ethyl cellulose used in Example 1 and 45 g of the diisopropyl fumarate/monoisopropyl fumarate/ethyl 4-nitrocinnamate copolymer obtained in Synthesis Example 13 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 70 wt %, diisopropyl fumarate/monoisopropyl fumarate/ethyl 4-nitrocinnamate copolymer: 30 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 14

75 g of the ethyl cellulose used in Example 1 and 75 g of the diisopropyl fumarate/monoethyl fumarate/ethyl 4-cyanocinnamate copolymer obtained in Synthesis Example 14 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoethyl fumarate/ethyl 4-cyanocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 15

90 g of the ethyl cellulose used in Example 1 and 60 g of the diisopropyl fumarate/monoethyl fumarate/ethyl 4-cyanocinnamate copolymer obtained in Synthesis Example 15 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diisopropyl fumarate/monoethyl fumarate/ethyl 4-cyanocinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 16

75 g of the ethyl cellulose used in Example 1 and 75 g of the diisopropyl fumarate/monoethyl fumarate/ethyl 4-bromocinnamate copolymer obtained in Synthesis Example 16 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/monoethyl fumarate/ethyl 4-bromocinnamate copolymer: 50 wt %). The optical compensation film obtained was cut into a 50 mm square and uniaxially stretched to 2.0 times at 150° C. (thickness after stretching: 30 pun). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 17

75 g of the ethyl cellulose used in Example 1 and 75 g of the diisopropyl fumarate/monoethyl fumarate/ethyl 4-nitrocinnamate copolymer obtained in Synthesis Example 17 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 50 wt %, diisopropyl fumarate/monoethyl fumarate/ethyl 4-nitrocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had target optical properties in terms of in-plane retardation (Re) and Nz coefficient and had a large Re(589)/film thickness ratio.

Example 18

75 g of the ethyl cellulose used in Example 1 and 75 g of the diisopropyl fumarate/monoethyl fumarate/ethyl 4-cyanocinnamate copolymer obtained in Synthesis Example 18 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 50 wt %, diisopropyl fumarate/monoethyl fumarate/ethyl 4-cyanocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had target optical properties in terms of in-plane retardation (Re) and Nz coefficient and had a large Re(589)/film thickness ratio.

Example 19

80 g of ethyl cellulose (ETHOCEL standard 100, produced by Dow Chemical Co., molecular weight Mn=55,000, molecular weight Mw=176,000, Mw/Mn=3.2, total degree of substitution DS=2.5) as the cellulose-based resin and 70 g of the diethyl fumarate/monoethyl fumarate/ethyl 4-nitrocinnamate copolymer obtained in Synthesis Example 19 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 53 wt %, diethyl fumarate/monoethyl fumarate/ethyl 4-nitrocinnamate copolymer: 47 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 20

90 g of the ethyl cellulose used in Example 1 and 60 g of the diethyl fumarate/ethyl 4-nitrocinnamate copolymer obtained in Synthesis Example 20 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, diethyl fumarate/ethyl 4-nitrocinnamate copolymer: 40 wt %). The optical compensation film obtained was cut into a 50 mm square and uniaxially stretched to 2.0 times at 150° C. (thickness after stretching: 30 km). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 21

75 g of the ethyl cellulose used in Example 1 and 75 g of the diethyl fumarate/monoethyl fumarate/ethyl 4-cyanocinnamate copolymer obtained in Synthesis Example 21 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoethyl fumarate/ethyl 4-cyanocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 22

85 g of the ethyl cellulose used in Example 1 and 65 g of the diethyl fumarate/ethyl 4-cyanocinnamate copolymer obtained in Synthesis Example 22 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 57 wt %, diethyl fumarate/ethyl 4-cyanocinnamate copolymer: 43 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 23

75 g of the ethyl cellulose used in Example 1 and 75 g of the diethyl fumarate/monoethyl fumarate/ethyl 4-bromocinnamate copolymer obtained in Synthesis Example 23 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diethyl fumarate/monoethyl fumarate/ethyl 4-bromocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 24

80 g of ethyl cellulose (ETHOCEL standard 100, produced by Dow Chemical Co., molecular weight Mn=55,000, molecular weight Mw=176,000, Mw/Mn=3.2, total degree of substitution DS=2.5) as the cellulose-based resin and 70 g of the di-tert-butyl fumarate/monoethyl fumarate/ethyl 4-nitrocinnamate copolymer obtained in Synthesis Example 25 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 53 wt %, di-tert-butyl fumarate/monoethyl fumarate/ethyl 4-nitrocinnamate copolymer: 47 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 25

90 g of the ethyl cellulose used in Example 1 and 60 g of the di-tert-butyl fumarate/monoisopropyl fumarate/ethyl 4-nitrocinnamate copolymer obtained in Synthesis Example 26 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, di-tert-butyl fumarate/monoisopropyl fumarate/ethyl 4-nitrocinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 26

105 g of the ethyl cellulose used in Example 1 and 45 g of the di-tert-butyl fumarate/monoisopropyl fumarate/ethyl 4-nitrocinnamate copolymer obtained in Synthesis Example 27 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 70 wt %, di-tert-butyl fumarate/monoisopropyl fumarate/ethyl 4-nitrocinnamate copolymer: 30 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 27

75 g of the ethyl cellulose used in Example 1 and 75 g of the di-tert-butyl fumarate/monoethyl fumarate/ethyl 4-cyanocinnamate copolymer obtained in Synthesis Example 28 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoethyl fumarate/ethyl 4-cyanocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 28

90 g of the ethyl cellulose used in Example 1 and 60 g of the di-tert-butyl fumarate/monoethyl fumarate/ethyl 4-cyanocinnamate copolymer obtained in Synthesis Example 29 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 60 wt %, di-tert-butyl fumarate/monoethyl fumarate/ethyl 4-cyanocinnamate copolymer: 40 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 29

75 g of the ethyl cellulose used in Example 1 and 75 g of the di-tert-butyl fumarate/monoethyl fumarate/ethyl 4-bromocinnamate copolymer obtained in Synthesis Example 30 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, di-tert-butyl fumarate/monoethyl fumarate/ethyl 4-bromocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 30

75 g of the ethyl cellulose used in Example 1 and 75 g of the di-tert-butyl fumarate/monoethyl fumarate/ethyl 4-nitrocinnamate copolymer obtained in Synthesis Example 31 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 50 wt %, di-tert-butyl fumarate/monoethyl fumarate/ethyl 4-nitrocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had target optical properties in terms of in-plane retardation (Re) and Nz coefficient and had a large Re(589)/film thickness ratio.

Example 31

78 g of ethyl cellulose (ETHOCEL standard 100, produced by Dow Chemical Co., molecular weight Mn=55,000, molecular weight Mw=176,000, Mw/Mn=3.2, total degree of substitution DS=2.5) as the cellulose-based resin and 72 g of the diisopropyl fumarate/diethyl fumarate/2-hydroxyethyl acrylate/ethyl 4-nitrocinnamate copolymer obtained in Synthesis Example 32 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 52 wt %, diisopropyl fumarate/diethyl fumarate/2-hydroxyethyl acrylate/ethyl 4-nitrocinnamate copolymer: 48 wt %). The optical compensation film obtained was cut into a 50 mm square and uniaxially stretched to 2.0 times at 150° C. (thickness after stretching: 30 μm).

The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 32

88 g of the ethyl cellulose used in Example 1 and 62 g of the diisopropyl fumarate/N-(n-butoxymethyl)acrylamide/ethyl 4-nitrocinnamate copolymer obtained in Synthesis Example 33 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 59 wt %, diisopropyl fumarate/N-(n-butoxymethyl)acrylamide/ethyl 4-nitrocinnamate copolymer: 41 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 33

102 g of the ethyl cellulose used in Example 1 and 48 g of the diisopropyl fumarate/diethyl fumarate/2-hydroxyethyl acrylate/ethyl 4-nitrocinnamate copolymer obtained in Synthesis Example 34 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 68 wt %, diisopropyl fumarate/diethyl fumarate/2-hydroxyethyl acrylate/ethyl 4-nitrocinnamate copolymer: 32 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 34

88 g of the ethyl cellulose used in Example 1 and 62 g of the diisopropyl fumarate/diethyl fumarate/2-hydroxyethyl acrylate/ethyl 4-cyanocinnamate copolymer obtained in Synthesis Example 35 were dissolved in methylene chloride: acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 59 wt %, diisopropyl fumarate/diethyl fumarate/2-hydroxyethyl acrylate/ethyl 4-cyanocinnamate copolymer: 41 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Example 35

75 g of the ethyl cellulose used in Example 1 and 75 g of the diisopropyl fumarate/N-(n-butoxymethyl)acrylamide/ethyl 4-bromocinnamate copolymer obtained in Synthesis Example 36 were dissolved in methylene chloride:acetone=8:2 (weight ratio) to make a 18 wt % resin solution, and the resin solution was cast on a polyethylene terephthalate film by means of a coater and dried at a drying temperature of 25° C. to obtain an optical compensation film (resin composition) having a width of 150 mm (ethyl cellulose: 50 wt %, diisopropyl fumarate/N-(n-butoxymethyl)acrylamide/ethyl 4-bromocinnamate copolymer: 50 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 2.

The obtained optical compensation film had high light transmittance, excellent transparency, small haze, and target optical properties in terms of in-plane retardation (Re) and Nz coefficient, and had a large Re(589)/film thickness ratio.

Comparative Example 1

150 g of the ethyl cellulose used in Example 1 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film having a width of 150 mm. The optical compensation film obtained was cut into a 50 mm square and uniaxially stretched to 1.4 times at 150° C. (thickness after stretching: 30 μm). The resulting film was measured for light transmittance, haze, retardation characteristics and wavelength dispersion characteristics, and the results thereof are shown in Table 3.

TABLE 3

| | Light Transmittance (%) | Haze (%) | Re (nm) | Re/Thickness (nm/μm) | Rth (nm) | Nz Coefficient | Re(450)/Re(550) |
|---|---|---|---|---|---|---|---|
| Comparative Example 1 | 94 | 0.3 | 335 | 11.2 | 227 | 1.18 | 1.00 |
| Comparative Example 2 | 94 | 0.3 | 1 | 0.0 | −348 | — | 1.05 |
| Comparative Example 3 | 94 | 0.3 | 1 | 0.0 | −180 | — | 1.05 |
| Comparative Example 4 | 94 | 0.3 | 1 | 0.0 | −147 | — | 1.04 |
| Comparative Example 5 | 94 | 0.3 | 1 | 0.0 | −174 | — | 1.04 |
| Comparative Example 6 | 94 | 0.3 | 1 | 0.0 | −168 | — | 1.05 |
| Comparative Example 7 | 94 | 0.3 | 1 | 0.0 | −300 | — | 1.05 |
| Comparative Example 8 | 92 | 0.7 | 43 | 1.4 | −180 | −3.73 | 0.98 |
| Comparative Example 9 | 92 | 0.6 | 46 | 1.5 | −98 | −1.64 | 0.98 |
| Comparative Example 10 | 92 | 0.6 | 49 | 1.6 | −57 | −0.67 | 0.98 |
| Comparative Example 11 | 93 | 0.5 | 31 | 1.5 | −90 | −2.44 | 0.98 |
| Comparative Example 12 | 93 | 0.5 | 52 | 1.7 | −77 | −0.98 | 0.98 |

The obtained film had a large out-of-plane retardation (Rth) in the thickness direction, failing in having target optical properties.

Comparative Example 2

180 g of the monoethyl fumarate/ethyl 4-methoxycinnamate copolymer used in Example 1 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 40 μm. The resulting film was measured for light transmittance, haze, retardation characteristics and wavelength dispersion characteristics, and the results thereof are shown together in Table 3.

The obtained film had a small out-of-plane retardation (Rth) in the thickness direction, failing in having target optical properties.

Comparative Example 3

180 g of the diisopropyl fumarate/monoethyl fumarate/ethyl 4-nitrocinnamate copolymer used in Example 11 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 40 μm. The resulting film was measured for light transmittance, haze, retardation characteristics and wavelength dispersion characteristics, and the results thereof are shown together in Table 3.

The obtained film had a small out-of-plane retardation (Rth) in the thickness direction, failing in having target optical properties.

Comparative Example 4

180 g of the diethyl fumarate/monoethyl fumarate/ethyl 4-nitrocinnamate copolymer used in Example 19 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 40 μm. The resulting film was measured for light transmittance, haze, retardation characteristics and wavelength dispersion characteristics, and the results thereof are shown together in Table 3.

The obtained film had a small out-of-plane retardation (Rth) in the thickness direction, failing in having target optical properties.

Comparative Example 5

180 g of the di-tert-butyl fumarate/monoethyl fumarate/ethyl 4-nitrocinnamate copolymer used in Example 24 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 40 μm. The resulting film was measured for light transmittance, haze, retardation characteristics and wavelength dispersion characteristics, and the results thereof are shown together in Table 3.

The obtained film had a small out-of-plane retardation (Rth) in the thickness direction, failing in having target optical properties.

Comparative Example 6

180 g of the diisopropyl fumarate/diethyl fumarate/2-hydroxyethyl acrylate/ethyl 4-nitrocinnamate copolymer used in Example 31 was dissolved in methylene chloride:acetone=8:2 (weight ratio) to make a 18 wt % resin solution, and the resin solution was cast on a support of a solution casting apparatus by a T-die method and dried at a drying temperature of 25° C. to obtain a film (resin composition) having a width of 150 mm and a thickness of 40 μm. The resulting film was measured for light transmittance, haze, retardation characteristics and wavelength dispersion characteristics, and the results thereof are shown together in Table 3.

The obtained film had a small out-of-plane retardation (Rth) in the thickness direction, failing in having target optical properties.

Comparative Example 7

30 g of the ethyl cellulose used in Example 1 and 120 g of the monoethyl fumarate/ethyl 4-methoxycinnamate copolymer obtained in Synthesis Example 1 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, monoethyl fumarate/ethyl 4-methoxycinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

Comparative Example 8

30 g of the ethyl cellulose used in Example 1 and 120 g of the diisopropyl fumarate/N-(n-butoxymethyl)acrylamide/ethyl 4-methoxycinnamate copolymer obtained in Synthesis Example 7 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, diisopropyl fumarate/N-(n-butoxymethyl)acrylamide/ethyl 4-methoxycinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

Comparative Example 9

30 g of the ethyl cellulose used in Example 1 and 120 g of the diisopropyl fumarate/monoethyl fumarate/ethyl 4-nitrocinnamate copolymer obtained in Synthesis Example 11 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, diisopropyl fumarate/monoethyl fumarate/ethyl 4-nitrocinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

Comparative Example 10

30 g of the ethyl cellulose used in Example 1 and 120 g of the diethyl fumarate/monoethyl fumarate/ethyl 4-nitrocinnamate copolymer obtained in Synthesis Example 19 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, diethyl fumarate/monoethyl fumarate/ethyl 4-nitrocinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

Comparative Example 11

30 g of the ethyl cellulose used in Example 1 and 120 g of the di-tert-butyl fumarate/monoethyl fumarate/ethyl 4-nitrocinnamate copolymer obtained in Synthesis Example 25 were dissolved in methylene chloride:acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, di-tert-butyl fumarate/monoethyl fumarate/ethyl 4-nitrocinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

Comparative Example 12

30 g of the ethyl cellulose used in Example 1 and 120 g of the diisopropyl fumarate/diethyl fumarate/2-hydroxyethyl acrylate/ethyl 4-nitrocinnamate copolymer obtained in Synthesis Example 32 were dissolved in methylene chloride: acetone=8:2 (weight ratio) to make a 18 wt % resin solution, and the resin solution was cast on a support of a solution casting apparatus by a T-die method and dried at a drying temperature of 25° C. to obtain an optical compensation film (resin composition) having a width of 150 mm (ethyl cellulose: 20 wt %, diisopropyl fumarate/diethyl fumarate/2-hydroxyethyl acrylate/ethyl 4-nitrocinnamate copolymer: 80 wt %). The optical compensation film obtained was cut into a 50 mm square and uniaxially stretched to 2.0 times at 150° C. (thickness after stretching: 30 μm). The resulting optical compensation film was measured for light transmittance, haze, retardation characteristics and wavelength dispersion characteristics, and the results thereof are shown together in Table 3.

The obtained film did not have target optical properties in terms of in-plane retardation (Re) and Nz coefficient.

All contents of the descriptions, claims and abstracts of Japanese Patent Application No. 2014-210357 filed Oct. 15, 2014, Japanese Patent Application No. 2014-210358 filed Oct. 15, 2014, Japanese Patent Application No. 2014-238140 filed Nov. 25, 2014, Japanese Patent Application No. 2014-239366 filed Nov. 26, 2014, Japanese Patent Application No. 2014-239367 filed Nov. 26, 2014, and Japanese Patent Application No. 2015-185764 filed Sep. 18, 2015 are cited herein and incorporated as a disclosure of the description of the present invention.

The invention claimed is:

1. A resin composition, comprising, as resin components:
   from 30 to 99 wt % of a cellulose-containing resin represented by the following formula (1); and
   from 1 to 70 wt % of a cinnamic acid ester copolymer:

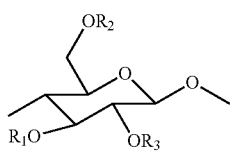
(1)

wherein each of $R_1$, $R_2$ and $R_3$ independently represents hydrogen or a substituent having a carbon number of 1 to 12.

2. The resin composition according to claim 1, wherein the cinnamic acid ester copolymer comprises from 10 to 90 mol % of an alkoxycinnamic acid ester residue unit represented by the following formula (2):

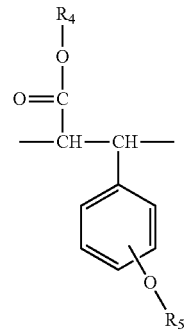
(2)

wherein each of $R_4$ and $R_5$ independently represents an alkyl group having a carbon number of 1 to 12.

3. The resin composition according to claim 2, wherein the cinnamic acid ester copolymer comprises from 5 to 50 mol % of a fumaric acid monoester residue unit represented by the following formula (3), from 0 to 85 mol % of a fumaric acid diester residue unit represented by the following formula (4), and from 10 to 90 mol % of an alkoxycinnamic acid ester residue unit represented by the following formula (2):

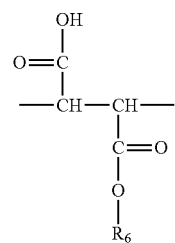
(3)

wherein $R_6$ represents an alkyl group having a carbon number of 1 to 12;

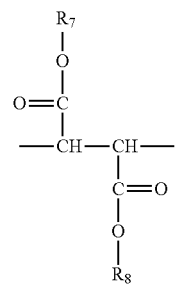
(4)

wherein each of $R_7$ and $R_8$ independently represents an alkyl group having a carbon number of 1 to 12; and

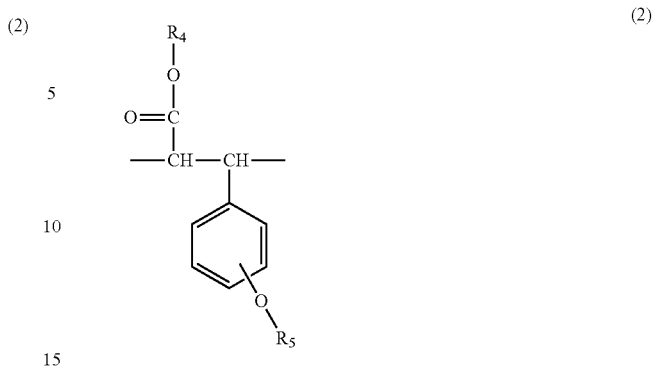

wherein each of $R_4$ and $R_5$ independently represents an alkyl group having a carbon number of 1 to 12.

4. The resin composition according to claim 2, wherein the cinnamic acid ester copolymer comprises from 10 to 50 mol % of a fumaric acid monoester residue unit represented by the following formula (3), from 0 to 60 mol % of a fumaric acid diester residue unit represented by the following formula (4), and from 30 to 90 mol % of an alkoxycinnamic acid ester residue unit represented by the following formula (2):

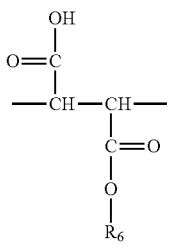

wherein $R_6$ represents an alkyl group having a carbon number of 1 to 12;

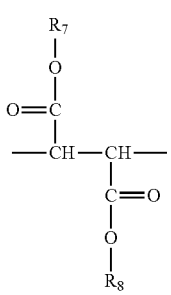

wherein each of $R_7$ and $R_8$ independently represents an alkyl group having a carbon number of 1 to 12; and

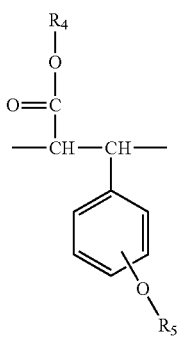

wherein each of $R_4$ and $R_5$ independently represents an alkyl group having a carbon number of 1 to 12.

5. The resin composition according to claim 2, wherein the cinnamic acid ester copolymer comprises:
from 5 to 50 mol % of a fumaric acid monoester residue unit selected from the group consisting of a monomethyl fumarate residue unit, a monoethyl fumarate residue unit, a monoisopropyl fumarate residue unit, a mono-n-propyl fumarate residue unit, a mono-n-butyl fumarate residue unit, a mono-tert-butyl fumarate residue unit, and a mono-2-ethylhexyl fumarate residue unit;
from 0 to 85 mol % of a fumaric acid diester residue unit selected from the group consisting of a dimethyl fumarate residue unit, a diethyl fumarate residue unit, a diisopropyl fumarate residue unit, a di-n-propyl fumarate residue unit, a di-n-butyl fumarate residue unit, a di-tert-butyl fumarate residue unit, and a di-2-ethylhexyl fumarate residue unit; and
from 10 to 90 mol % of an alkoxycinnamic acid ester residue unit represented by the following formula (2):

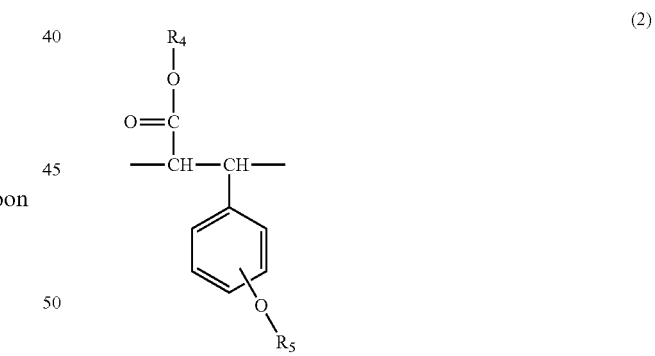

wherein each of $R_4$ and $R_5$ independently represents an alkyl group having a carbon number of 1 to 12.

6. The resin composition according to claim 2, wherein the cinnamic acid ester copolymer contains:
from 5 to 85 mol % of a fumaric acid diester residue unit represented by the following formula (4);
from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7) and a methacrylic acid amide residue unit represented by the following formula (8); and from 10 to 90 mol % of an alkoxycinnamic acid ester residue unit represented by the following formula (2):

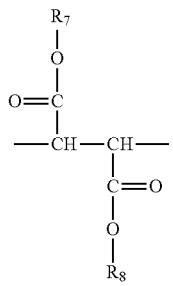
(4)

wherein each of $R_7$ and $R_8$ independently represents an alkyl group having a carbon number of 1, to 12;

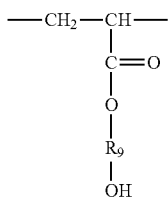
(5)

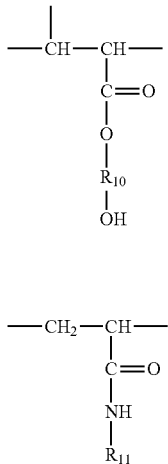
(6)

(7)

(8)

wherein each of $R_9$, $R_{10}$, $R_{11}$ and $R_{12}$ independently represents an alkyl group having a carbon number of 1 to 12, an alkylene group or an ether group; and (2)

wherein each of $R_4$ and $R_5$ independently represents an alkyl group having a carbon number of 1 to 12.

7. The resin composition according to claim 2, wherein the cinnamic acid ester copolymer comprises:

from 5 to 65 mol % of a fumaric acid diester residue unit represented by the following formula (4);

from 5 to 40 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8); and from 30 to 90 mol % of an alkoxycinnamic acid ester residue unit represented by the following formula (2):

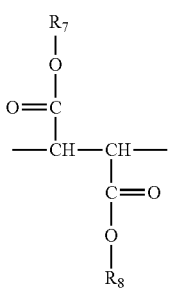
(4)

wherein each of $R_7$ and $R_8$ independently represents an alkyl group having a carbon number of 1 to 12;

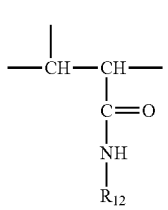
(5)

(6)

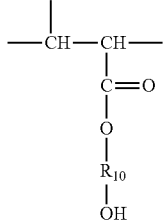

(7)

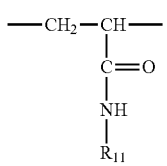

(8)

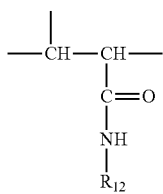

wherein each of $R_9$, $R_{10}$, $R_{11}$ and $R_{12}$ independently represents an alkyl group having a carbon number of 1 to 12, an alkylene group or an ether group; and (2)

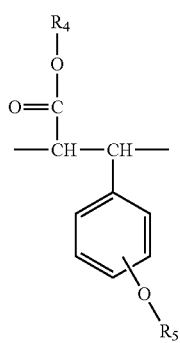

wherein each of $R_4$ and $R_5$ independently represents an alkyl group having a carbon number of 1 to 12.

8. The resin composition according to claim 1, wherein the cinnamic acid ester copolymer comprises 20 mol % or more of a fumaric acid diester residue unit represented by the following formula (4) and 5 mol % or more of a substituted cinnamic acid ester residue unit represented by the following formula (9):

(4)

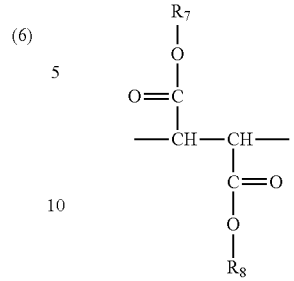

wherein each of $R_7$ and $R_8$ independently represents an alkyl group having a carbon number of 1 to 12; and (9)

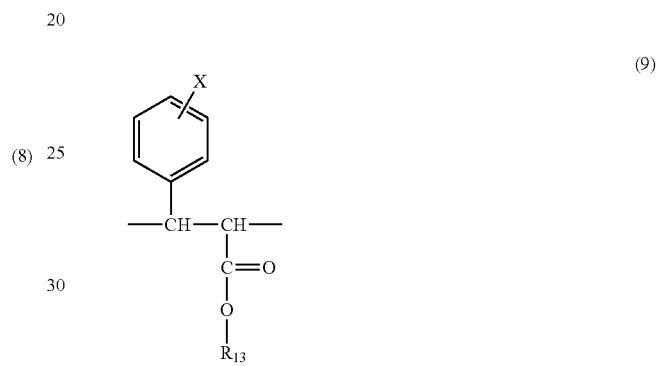

wherein $R_{13}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group.

9. The resin composition according to claim 1, wherein the cinnamic acid ester copolymer comprises 20 mol % or more of a fumaric acid diester residue unit represented by the following formula (4) and 5 mol % or more of a p-position-substituted cinnamic acid ester residue unit represented by the following formula (10):

(4)

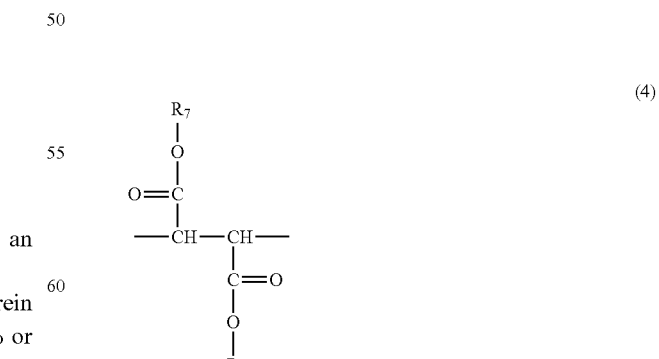

wherein each of $R_7$ and $R_8$ independently represents an alkyl group having a carbon number of 1 to 12; and

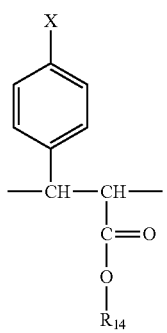

wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group.

10. The resin composition according to claim 1, wherein the cinnamic acid ester copolymer comprises from 20 to 90 mol % of a fumaric acid diester residue unit represented by the following formula (4), from 5 to 75 mol % of a p-position-substituted cinnamic acid ester residue unit represented by the following formula (10), and from 5 to 30 mol % of a fumaric acid monoester residue unit represented by the following formula (3):

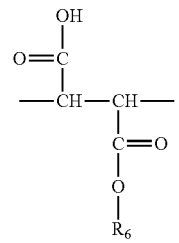

wherein each of $R_7$ and $R_8$ independently represents an alkyl group having a carbon number of 1 to 12;

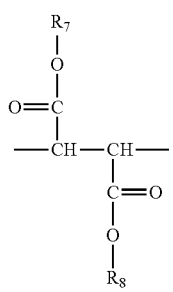

wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group; and

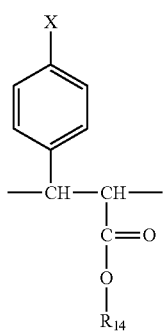

wherein $R_6$ represents an alkyl group having a carbon number of 1 to 12.

11. The resin composition according to claim 1, wherein the cinnamic acid ester copolymer is a cinnamic acid ester copolymer selected from the group consisting of:

a fumaric acid ester copolymer comprising from 20 to 95 mol % of a diethyl fumarate residue unit, from 5 to 75 mol % of a p-position-substituted cinnamic acid ester residue unit represented by the following formula (10), and from 0 to 30 mol % of a fumaric acid monoester residue unit represented by the following formula (3);

a fumaric acid ester copolymer comprising from 20 to 90 mol % of a diisopropyl fumarate residue unit, from 5 to 75 mol % of a p-position-substituted cinnamic acid ester residue unit represented by the following formula (10), and from 5 to 30 mol % of a fumaric acid monoester residue unit represented by the following formula (3);

and a fumaric acid ester copolymer comprising from 20 to 90 mol % of a di-tert-butyl fumarate residue unit, from 5 to 75 mol % of a p-position-substituted cinnamic acid ester residue unit represented by the following formula (10), and from 5 to 30 mol % of a fumaric acid monoester residue unit represented by the following formula (3):

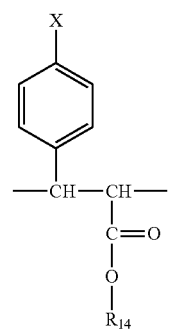

wherein $R_{14}$ represents an alkyl group having a carbon number of 1 to 12, and X represents a nitro group, a bromo group, an iodo group, a cyano group, a chloro group, a sulfonic acid group, a carboxylic acid group, a fluoro group or a phenyl group; and (3)

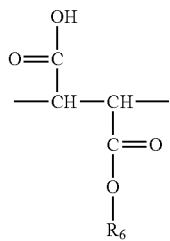

wherein $R_6$ represents an alkyl group having a carbon number of 1 to 12.

12. The resin composition according to claim 10, wherein the fumaric acid monoester residue unit is a fumaric acid monoester residue unit selected from the group consisting of a monomethyl fumarate residue unit, a monoethyl fumarate residue unit, a monoisopropyl fumarate residue unit, a mono-n-propyl fumarate residue unit, a mono-n-butyl fumarate residue unit, a mono-s-butyl fumarate residue unit, a mono-tert-butyl fumarate residue unit, and a mono-2-ethylhexyl fumarate residue unit.

13. The resin composition according to claim 1, wherein the cinnamic acid ester copolymer is a cinnamic acid ester copolymer comprising:

from 20 to 94.5 mol % of a fumaric acid diester residue unit represented by the following formula (4);

from 5 to 75 mol % of a p-position-substituted cinnamic acid ester residue unit represented by the following formula (10); and from 0.5 to 30 mol % of a residue unit selected from the group consisting of an acrylic acid ester residue unit represented by the following formula (5), a methacrylic acid ester residue unit represented by the following formula (6), an acrylic acid amide residue unit represented by the following formula (7), and a methacrylic acid amide residue unit represented by the following formula (8):

(4)

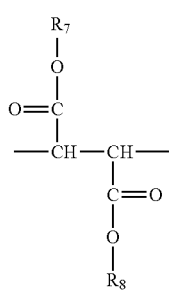

wherein each of $R_7$ and $R_8$ independently represents an alkyl group having a carbon number of 1 to 12;

(10)

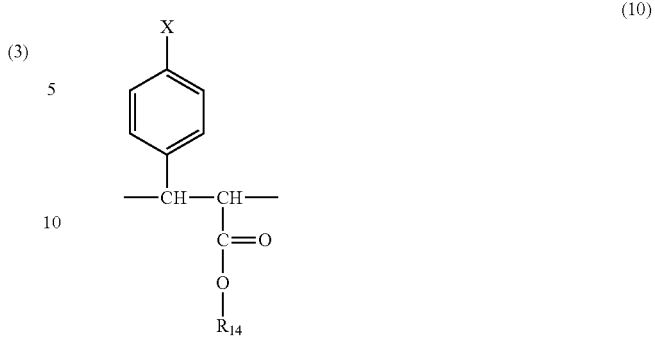

is a nitro group, a bromo group, an iodo group, a cyano group, a chloro group, a sulfonic acid group, a carboxylic acid group, a fluoro group or a phenyl group;

(5)

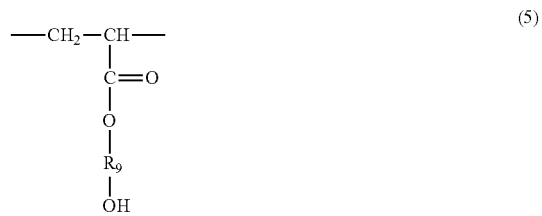

(6)

(7)

(8)

wherein each of $R_9$, $R_{10}$, $R_{11}$ and $R_{12}$ independently represents an alkyl group having a carbon number of 1 to 12, an alkylene group or an ether group.

14. The resin composition according to claim 9, wherein the p-position-substituted cinnamic acid ester residue unit is selected from the group consisting of a methyl 4-nitrocinnamate residue unit, an ethyl 4-nitrocinnamate residue unit, an isopropyl 4-nitrocinnamate residue unit, an n-propyl 4-nitrocinnamate residue unit, an n-butyl 4-nitrocinnamate residue unit, a sec-butyl 4-nitrocinnamate residue unit, a tert-butyl 4-nitrocinnamate residue unit, a 2-ethylhexyl 4-nitrocinnamate residue unit, a methyl 4-fluorocinnamate residue unit, an ethyl 4-fluorocinnamate residue unit, an isopropyl 4-fluorocinnamate residue unit, an n-propyl 4-fluorocinnamate residue unit, an n-butyl 4-fluorocinnamate residue unit, a sec-butyl 4-fluorocinnamate residue unit, a tert-butyl 4-fluorocinnamate residue unit, a 2-ethylhexyl 4-fluorocinnamate residue unit, a methyl 4-chlorocinnamate residue unit, an ethyl 4-chlorocinnamate residue unit, an isopropyl 4-chlorocinnamate residue unit, an n-propyl 4-chlorocinnamate residue unit, an n-butyl 4-chlorocinnamate residue unit, a sec-butyl 4-chlorocinnamate residue unit, a tert-butyl 4-chlorocinnamate residue unit, a 2-ethylhexyl 4-chlorocinnamate residue unit, a methyl 4-bromocinnamate residue unit, an ethyl 4-bromocinnamate residue unit, an isopropyl 4-bromocinnamate residue unit, an n-propyl 4-bromocinnamate residue unit, an n-butyl 4-bromocinnamate residue unit, a sec-butyl 4-bromocinnamate residue unit, a tert-butyl 4-bromocinnamate residue unit, a 2-ethylhexyl 4-bromocinnamate residue unit, a methyl 4-iodocinnamate residue unit, an ethyl 4-iodocinnamate residue unit, an isopropyl 4-iodocinnamate residue unit, an n-propyl 4-iodocinnamate residue unit, an n-butyl 4-iodocinnamate residue unit, a sec-butyl 4-iodocinnamate residue unit, a tert-butyl 4-iodocinnamate residue unit, a 2-ethylhexyl 4-iodocinnamate residue unit, a methyl 4-cyanocinnamate residue unit, an ethyl 4-cyanocinnamate residue unit, an isopropyl 4-cyanocinnamate residue unit, an n-propyl 4-cyanocinnamate residue unit, an n-butyl 4-cyanocinnamate residue unit, a sec-butyl 4-cyanocinnamate residue unit, a tert-butyl 4-cyanocinnamate residue unit, a 2-ethylhexyl 4-cyanocinnamate residue unit, a methyl 4-sulfonate cinnamate residue unit, an ethyl 4-sulfonate cinnamate residue unit, an isopropyl 4-sulfonate cinnamate residue unit, an n-propyl 4-sulfonate cinnamate residue unit, an n-butyl 4-sulfonate cinnamate residue unit, a sec-butyl 4-sulfonate cinnamate residue unit, a tert-butyl 4-sulfonate cinnamate residue unit, a 2-ethylhexyl 4-sulfonate cinnamate residue unit, an ethyl 4-carboxylate cinnamate residue unit, an isopropyl 4-carboxylate cinnamate residue unit, an n-propyl 4-carboxylate cinnamate residue unit, an n-butyl 4-carboxylate cinnamate residue unit, a sec-butyl 4-carboxylate cinnamate residue unit, a tert-butyl 4-carboxylate cinnamate residue unit, a 2-ethylhexyl 4-carboxylate cinnamate residue unit, a methyl 4-phenylcinnamate residue unit, an ethyl 4-phenylcinnamate residue unit, an isopropyl 4-phenylcinnamate residue unit, an n-propyl 4-phenylcinnamate residue unit, an n-butyl 4-phenylcinnamate residue unit, a sec-butyl 4-phenylcinnamate residue unit, a tert-butyl 4-phenylcinnamate residue unit, and a 2-ethylhexyl 4-phenylcinnamate residue unit.

15. The resin composition according to claim 1, wherein the cellulose-containing resin represented by formula (1) is a cellulose ether.

16. The resin composition according to claim 15, wherein an etherification degree (substitution degree) of the cellulose ether is from 1.5 to 3.0.

17. An optical compensation film, comprising the resin composition according to claim 1, wherein a thickness of the optical compensation film is from 5 to 200 μm.

18. An optical compensation film, comprising the resin composition according to claim 1, wherein a thickness of the optical compensation film is from 20 to 60 μm.

19. The optical compensation film according to claim 17, wherein an in-plane retardation (Re) represented by the following expression (1) is from 80 to 300 nm and a Nz coefficient represented by the following expression (2) is from 0.35 to 0.65:

$$Re = (ny-nx) \times d \quad (1)$$

$$Nz = (ny-nz)/(ny-nx) \quad (2)$$

wherein nx represents a refractive index in a fast axis direction in a film plane, ny represents a refractive index in a slow axis direction in a film plane, nz represents a refractive index outside a film plane, and d represents the film thickness.

20. The optical compensation film according to claim 17, wherein a in-plane retardation (Re) represented by the following expression (1) is from 50 to 300 nm and a Nz coefficient represented by the following expression (2) is from −0.2 to 0.2:

$$Re = (ny-nx) \times d \quad (1)$$

$$Nz = (ny-nz)/(ny-nx) \quad (2).$$

21. The optical compensation film according to claim 17, wherein an in-plane retardation (Re) represented by the following expression (1) is from 0 to 20 nm and an out-of-plane retardation (Rth) represented by the following expression (3) is from −150 to 20 nm:

$$Re = (ny-nx) \times d \quad (1)$$

$$Rth = [(nx+ny)/2 - nz] \times d \quad (3)$$

wherein nx represents a refractive index in a fast axis direction in a film plane, ny represents a refractive index in a slow axis direction in a film plane, nz represents a refractive index outside a film plane, and d represents the film thickness.

22. The optical compensation film according to claim 17, wherein a light transmittance is 85% or more.

23. The optical compensation film according to claim 17, wherein a haze is 1% or less.

24. The optical compensation film according to claim 17, wherein a ratio Re(450)/Re(550) between a retardation at 450 nm and a retardation at 550 nm is 0.60<Re(450)/Re(550)<1.05.

25. The optical compensation film according to claim 17, wherein a ratio Re(589) (nm)/film thickness (μm) between a retardation at 589 nm and a film thickness is 4.0 nm/μm or more.

26. A method for producing the optical compensation film according to claim 17, comprising:
dissolving, in a solvent, a resin composition comprising, as resin components, from 30 to 99 wt % of a cellulose-containing resin represented by the following formula (1) and from 1 to 70 wt % of a cinnamic acid ester copolymer;
casting the obtained resin solution on a base material; and
after drying, separating the resulting film from the base material:

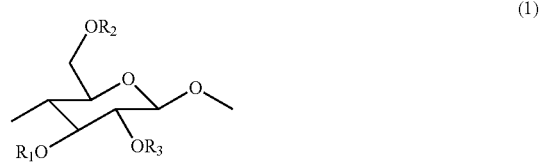

(1)

wherein each of $R_1$, $R_2$ and $R_3$ independently represents hydrogen or a substituent having a carbon number of 1 to 12.

27. The production method of an optical compensation film according to claim 26, wherein when the cellulose-containing resin represented by formula (1) is a cellulose ether, an etherification degree (substitution degree) is from 1.5 to 3.0.

28. A method for producing the optical compensation film according to claim 19, comprising:
subjecting a film having a thickness of 10 to 200 μm obtained by casting, to uniaxial stretching or unbalanced biaxial stretching.

29. A method for producing the optical compensation film according to claim 19, comprising:
subjecting a film having a thickness of 30 to 100 μm obtained by casting, to uniaxial stretching or unbalanced biaxial stretching.

* * * * *